US012278882B2

(12) United States Patent
Lee et al.

(10) Patent No.: US 12,278,882 B2
(45) Date of Patent: Apr. 15, 2025

(54) ELECTRONIC DEVICE WITH USER INTERFACING FOR DISPLAYING AND SELECTING IoT DEVICE(S) AND FOR DISPLAYING AND SELECTING CAPABILITIES OF EACH SELECTED IoT DEVICE

(71) Applicant: Samsung Electronics Co., Ltd., Suwon-si (KR)

(72) Inventors: Jongmyung Lee, Suwon-si (KR); Byungchul Kim, Suwon-si (KR); Donggyu Park, Suwon-si (KR); Hyosang Yoo, Suwon-si (KR); Gwanoh Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/351,328

(22) Filed: Jul. 12, 2023

(65) Prior Publication Data

US 2023/0362281 A1    Nov. 9, 2023

Related U.S. Application Data

(63) Continuation of application No. PCT/KR2021/019359, filed on Dec. 20, 2021.

(30) Foreign Application Priority Data

Jan. 12, 2021    (KR) .......................... 10-2021-0003858

(51) Int. Cl.
*G06F 3/048*    (2013.01)
*G06F 3/0482*    (2013.01)
(Continued)

(52) U.S. Cl.
CPC .............. *H04L 67/75* (2022.05); *G06F 3/048* (2013.01); *G06F 3/0482* (2013.01); *G06F 3/0484* (2013.01)

(58) Field of Classification Search
None
See application file for complete search history.

(56) References Cited

U.S. PATENT DOCUMENTS 8,775,157 B2 *  7/2014  Abdel-Kader .......... H04W 4/60
                                                        715/236
9,948,572 B2    4/2018  Sender et al.
(Continued)

FOREIGN PATENT DOCUMENTS

KR    101397471 B1    5/2014
KR    101745316 B1    6/2017
(Continued)

OTHER PUBLICATIONS

Khazael et al., "Complex Event Processing in Smart City Monitoring Applications," in IEEE Access, vol. 9, pp. 143150-143165, 2021. (Year: 2021).*

(Continued)

*Primary Examiner* — Amelia L Tapp
(74) *Attorney, Agent, or Firm* — NIXON & VANDERHYE P.C.

(57) ABSTRACT

Disclosed is an electronic device comprising a display, a processor operatively connected to the display, and a memory which is operatively connected to the display and the processor and stores a first application. The memory may store one or more instructions which, when executed, cause the processor to: control the display to display a first user interface based on the first application being executed; based on an input for selecting the first user interface being received, filter device information and function information for at least one Internet of things (IoT) device which (Continued)

supports a function associated with a first function provided by the first application, on the basis of IoT device information registered in a server and IoT device information supported by an application; control the display to display a second user interface including the filtered device information and function information for the at least one IoT device; and based on an input for selecting a first IoT device from among the at least one IoT being received through the second user interface, configure a second function of the first IoT device, which is associated with the first function, to be operated.

16 Claims, 18 Drawing Sheets

(51) Int. Cl.
    *G06F 3/0484*     (2022.01)
    *H04L 67/75*     (2022.01)

(56) References Cited

U.S. PATENT DOCUMENTS

| | | | |
|---|---|---|---|
| 10,142,454 | B2 | 11/2018 | Johnson et al. |
| 10,290,205 | B2 | 5/2019 | Lee et al. |
| 10,547,731 | B2 | 1/2020 | Kim et al. |
| 10,798,028 | B2 | 10/2020 | Fung et al. |
| 11,372,498 | B2 | 6/2022 | Kang et al. |
| 11,531,835 | B2 | 12/2022 | Lee |
| 2016/0241994 | A1* | 8/2016 | Iguchi ................... H04W 4/029 |
| 2018/0096282 | A1* | 4/2018 | Ready ................... G06F 16/284 |
| 2018/0139265 | A1* | 5/2018 | Shah ....................... H04L 67/10 |
| 2018/0198727 | A1 | 7/2018 | Sender et al. |
| 2018/0210740 | A1 | 7/2018 | Roman et al. |
| 2018/0213037 | A1 | 7/2018 | Roman et al. |
| 2019/0034380 | A1* | 1/2019 | Freitas ................ G06F 11/3013 |
| 2020/0005777 | A1* | 1/2020 | Wittke .................. H04L 67/535 |
| 2020/0137175 | A1 | 4/2020 | Ganci, Jr. et al. |

FOREIGN PATENT DOCUMENTS

| | | |
|---|---|---|
| KR | 20170086750 A | 7/2017 |
| KR | 101797812 B1 | 11/2017 |
| KR | 101833539 B1 | 3/2018 |
| KR | 101873538 B1 | 7/2018 |
| KR | 20180110410 A | 10/2018 |
| KR | 20190113981 A | 10/2019 |
| KR | 20190115498 A | 10/2019 |
| KR | 20200012133 A | 2/2020 |
| KR | 102112016 B1 | 5/2020 |
| KR | 102197448 B1 | 12/2020 |
| KR | 102339857 B1 | 12/2021 |

OTHER PUBLICATIONS

Extended European Search Report dated Mar. 27, 2024 issued in European Patent Application No. 21919910.6.
International Search Report for PCT/KR2021/019359 mailed Mar. 25, 2022, 2 pages.
Written Opinion of the ISA for PCT/KR2021/019359 mailed Mar. 25, 2022, 4 pages.
Office Action for IN Application No. 202337046900 dated Dec. 30, 2024, 6 pages.
Office Action for EP Application No. 21919910.6 dated Jan. 20, 2025, 8 pages.

* cited by examiner

ELECTRONIC DEVICE WITH USER INTERFACING FOR DISPLAYING AND SELECTING IoT DEVICE(S) AND FOR DISPLAYING AND SELECTING CAPABILITIES OF EACH SELECTED IoT DEVICE

CROSS-REFERENCE TO RELATED APPLICATIONS

This application is a continuation of International Application No. PCT/KR2021/019359 designating the United States, filed on Dec. 20, 2021, in the Korean Intellectual Property Receiving Office and claiming priority to Korean Patent Application No. 10-2021-003858, filed on Jan. 12, 2021, in the Korean Intellectual Property Office, the disclosures of each of which are incorporated by reference herein in their entireties.

BACKGROUND

Field

The disclosure relates to an electronic device for providing a user interface and a method therefor.

Description of Related Art

An Internet of things (IoT) technology is a technology for connecting various things through wireless communication. Herein, the things may include various embedded systems such as home appliances, mobile devices, or wearable devices. It is an artificial intelligence technology where the things connected over the Internet transmit and receive data to analyze it by itself and provide a user with the learned information and where the user is able to remotely adjust it.

With the development of the IoT technology, applications for managing and controlling various IoT devices and capabilities of the IoT devices have been developed.

An IoT-related application may fail to define and service an IoT device and capability supported for each application or each scenario. For example, there is an inconvenience where a user should directly specify how to operate which IoT device in which case to control the IoT device when a specified event occurs. Furthermore, the user may specify an event capable of being used as a condition for operating the IoT device by means of each application.

SUMMARY

Embodiments of the disclosure provide an electronic device for linking an IoT environment to user experiences provided by various applications loaded into the electronic device although an IoT-related application may not be used and a method therefor.

According to an example embodiment of the disclosure, an electronic device is provided. The electronic device may include: a display, a processor operatively connected with the display, and a memory operatively connected with the display and the processor and storing a first application. The memory may store one or more instructions which, when executed, cause the processor to be configured to: control the display to display a first user interface on the display based on the first application being run, filter device information and capability information about at least one Internet of things (IoT) device which supports a capability associated with a first capability provided by the first application based on IoT device information registered with a server and IoT device information supported by an application as an input for selecting the first user interface being received, control the display to display a second user interface including the filtered device information and the filtered capability information about the at least one IoT device on the display, and set a second capability of a first IoT device among the at least one IoT device, the second capability being associated with the first capability, to operate as an input for selecting the first IoT device being received through the second user interface.

According to an example embodiment of the disclosure, a method for providing a user interface in an electronic device is provided. The method may include: displaying a first user interface on a display of the electronic device based on a first application stored in a memory of the electronic device being run, filtering device information and capability information about at least one Internet of things (IoT) device which supports a capability associated with a first capability provided by the first application based on IoT device information registered with a server and IoT device information supported by an application as an input for selecting the first user interface being received, displaying a second user interface including the filtered device information and the filtered capability information about the at least one IoT device on the display, and setting a second capability of a first IoT device among the at least one IoT device, the second capability being associated with the first capability, to operate as an input for selecting the first IoT device is received through the second user interface.

According to various example embodiments of the disclosure, a user interface for setting an operation of an IoT device for each application may be actively configured and provided in response to the request received from each application. Thus, as each application is able to provide the user with an experience interworking with an IoT environment without understanding of an IoT environment and the user is able to link the IoT environment when specifying an event in each application, a user experience may be improved.

Furthermore, according to various example embodiments of the disclosure, it is possible to easily add an IoT device supported by each application and a capability of the IoT device when data of an IoT server or an application policy server is updated, improved scalability may be provided.

Furthermore, according to various example embodiments of the disclosure, a capability of controlling an IoT device may be provided when the user is in the same or similar location to the IoT device, rather than controlling the IoT device in any case when a specified event occurs.

In addition, various effects ascertained directly or indirectly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar denotations may be used for the same or similar components.

DETAILED DESCRIPTION

Figure 1:
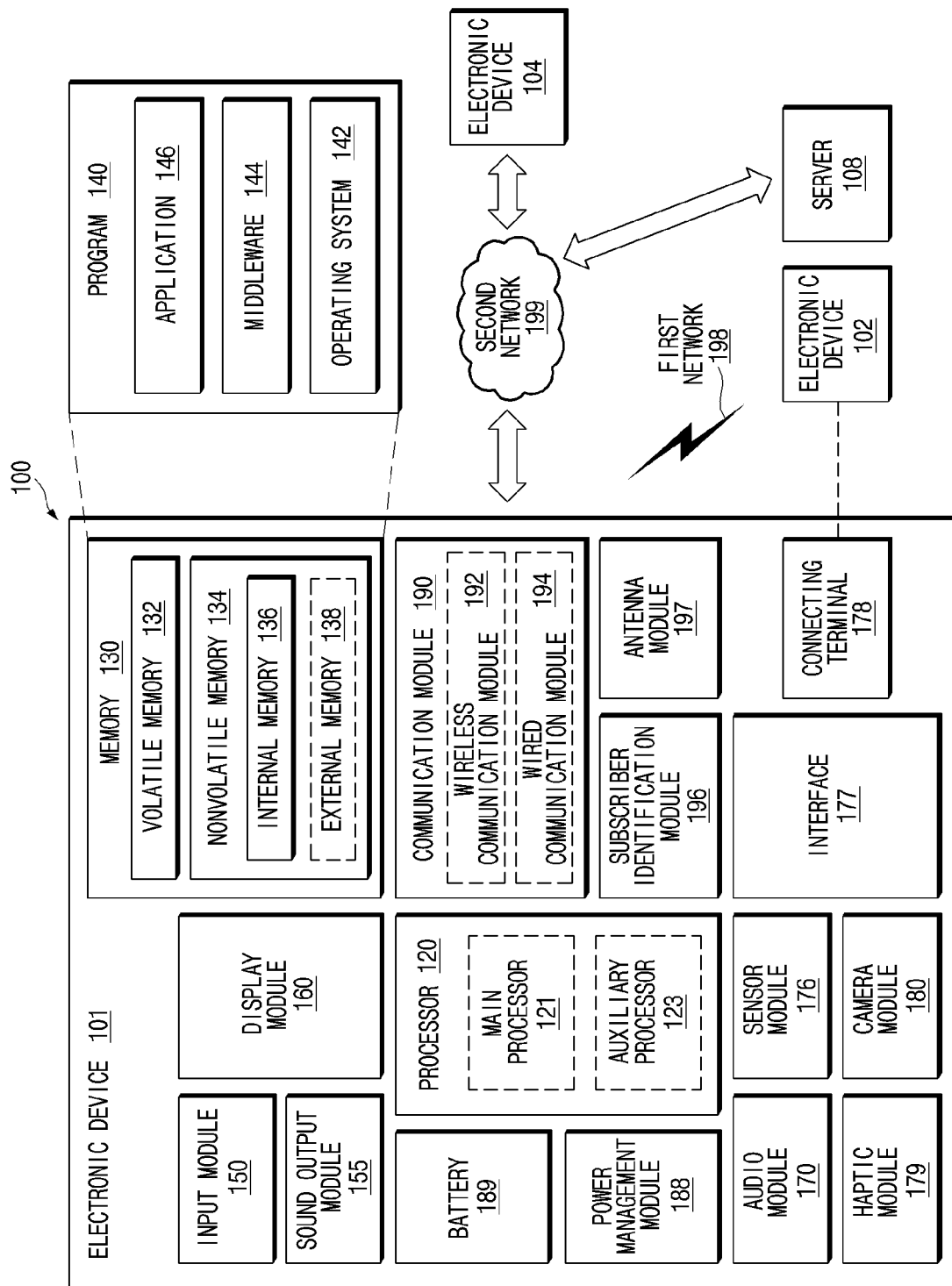
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)).

These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
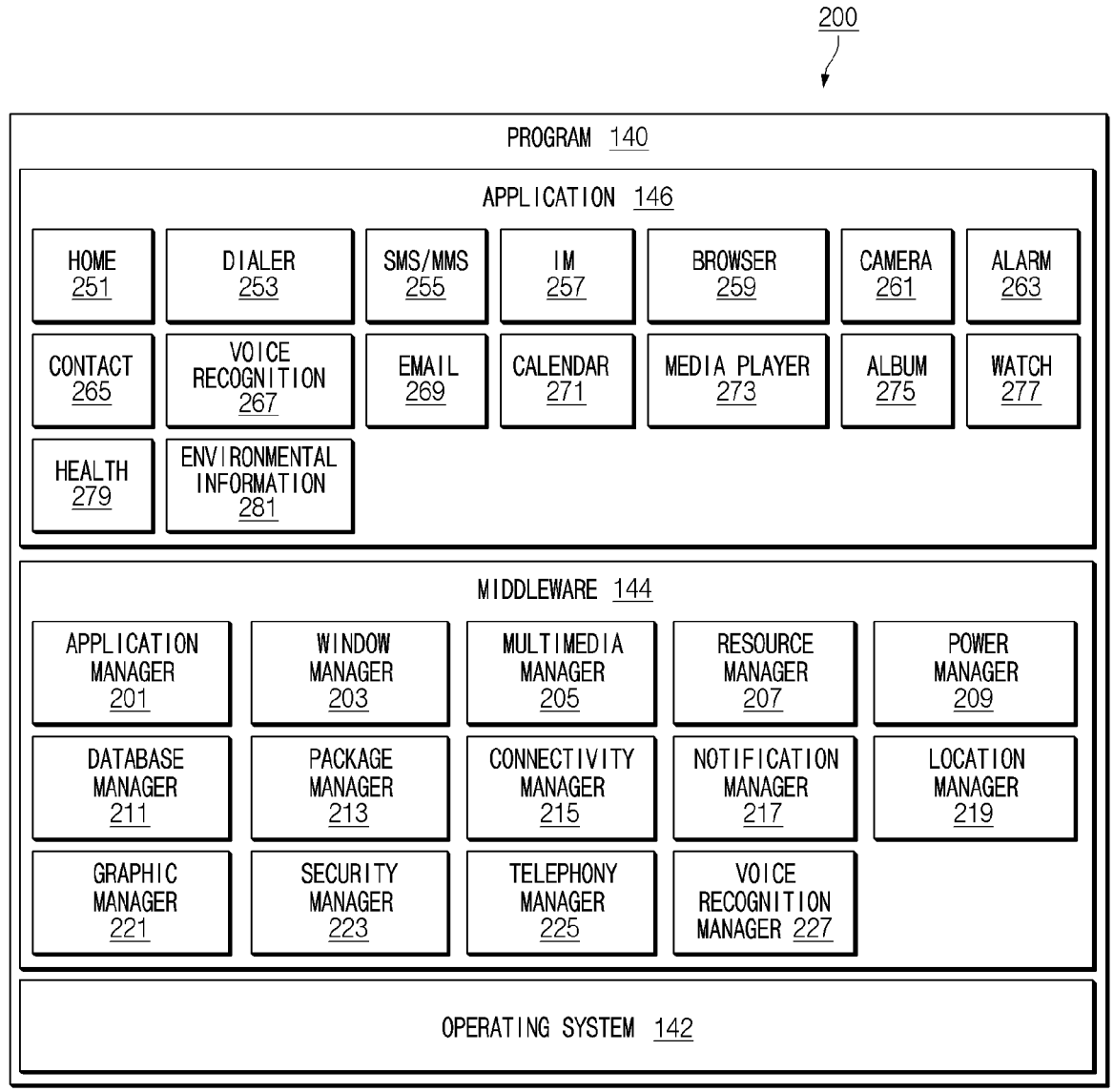
FIG. 2 is a block diagram illustrating an example program according to various embodiments.

FIG. 2 is a block diagram 200 illustrating an example program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, a more detailed description will be given of an example operation of an electronic device according to various embodiments with reference to FIGS. 3 and 4.

Figure 3:
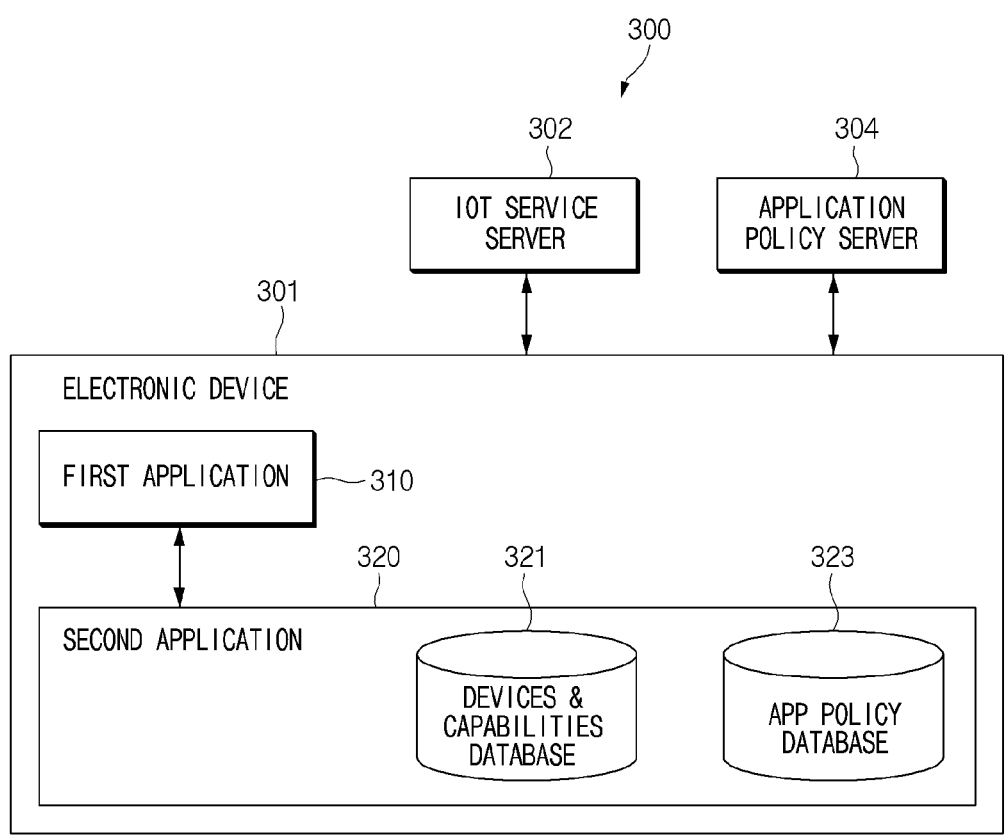
FIG. 3 is a block diagram illustrating an example configuration of an electronic device in a network environment, according to an embodiment.

FIG. 3 is a block diagram illustrating an example configuration of an electronic device 301 in a network environment 300, according to various embodiments. FIG. 4 is a signal flow diagram 400 illustrating an example operation of an electronic device 301 according to various embodiments. Operations of the electronic device 301, which will be described below, may be performed by a processor (e.g., a processor 120 of FIG. 1) of an electronic device (e.g., an electronic device 101 of FIG. 1). Instructions causing the processor of the electronic device to perform operations described below may be stored in a memory (e.g., a memory 130 of FIG. 1) of the electronic device.

Referring to FIG. 3, the electronic device 301 according to an embodiment may include a first application 310 and a second application 320. According to an embodiment, the first application 310 and the second application 320 may be stored in a memory (e.g., the memory 130 of FIG. 1) of the electronic device 301. According to an embodiment, the first application 310 may be an application configured to perform a specified capability. For example, the first application 310 may include a clock (e.g., an alarm 263 of FIG. 2), calendar (e.g., a calendar 271 of FIG. 2), accessibility, call, weather (e.g., environmental information 281 of FIG. 2), smart view (e.g., content viewing environment provision through mirroring), or third party application. According to an embodiment, the second application 320 may be an application for linking at least one capability performed by the first application 310 with an Internet of things (IoT) device. The second application 320 of the disclosure is not limited to the application, which may be an IoT platform which communicates with various applications (e.g., the first application 310) stored in the electronic device 301 and an IoT service server 302. For example, the second application 320 may provide a user interface (UI) for setting a second capability of an IoT device, which is associated with a first capability provided by the first application 310, to operate when the first capability is executed. A more detailed description will be given of a method for providing a user interface in the second application 320 according to an example embodiment with reference to FIG. 4. The second application 320 may control the second capability of the IoT device to operate when an event which is an execution condition of the first capability occurs.

According to an embodiment, the second application 320 may include a devices & capabilities database 321 and an app policy database 323. The devices & capabilities database 321 may store device information and capability information of the IoT device registered with at least one user account. The app policy database 323 may store policy information of the application. The policy information of the application may include, for example, device information and capability information of an IoT device supported by at least one application (e.g., the first application 310) stored in the electronic device 301. According to an embodiment, the IoT device supported by the application may include an IoT device which supports a capability associated with at least one capability provided by the application.

According to an embodiment, the electronic device 301 may communicate with a server (e.g., a server 108 of FIG. 1) through a communication circuit (e.g., a communication module 190 of FIG. 1) in the network environment 300. According to an embodiment, the electronic device 301 may communicate with the IoT service server 302 and/or an application policy server 304. According to an embodiment, the IoT service server 302 may store information about an IoT device registered with each user account for each user account and a capability of the registered IoT device. According to an embodiment, the application policy server 304 may store an IoT device predefined for each scenario supported by each application and capability information of the IoT device. According to an embodiment, the scenario may be referred to as a capability provided by the application. According to an embodiment, the application policy server 304 may be updated by a user of the application or a developer of the application. The application policy server 304 may store an IoT device updated for each scenario supported by each application and capability information of the IoT device.

Figure 4:
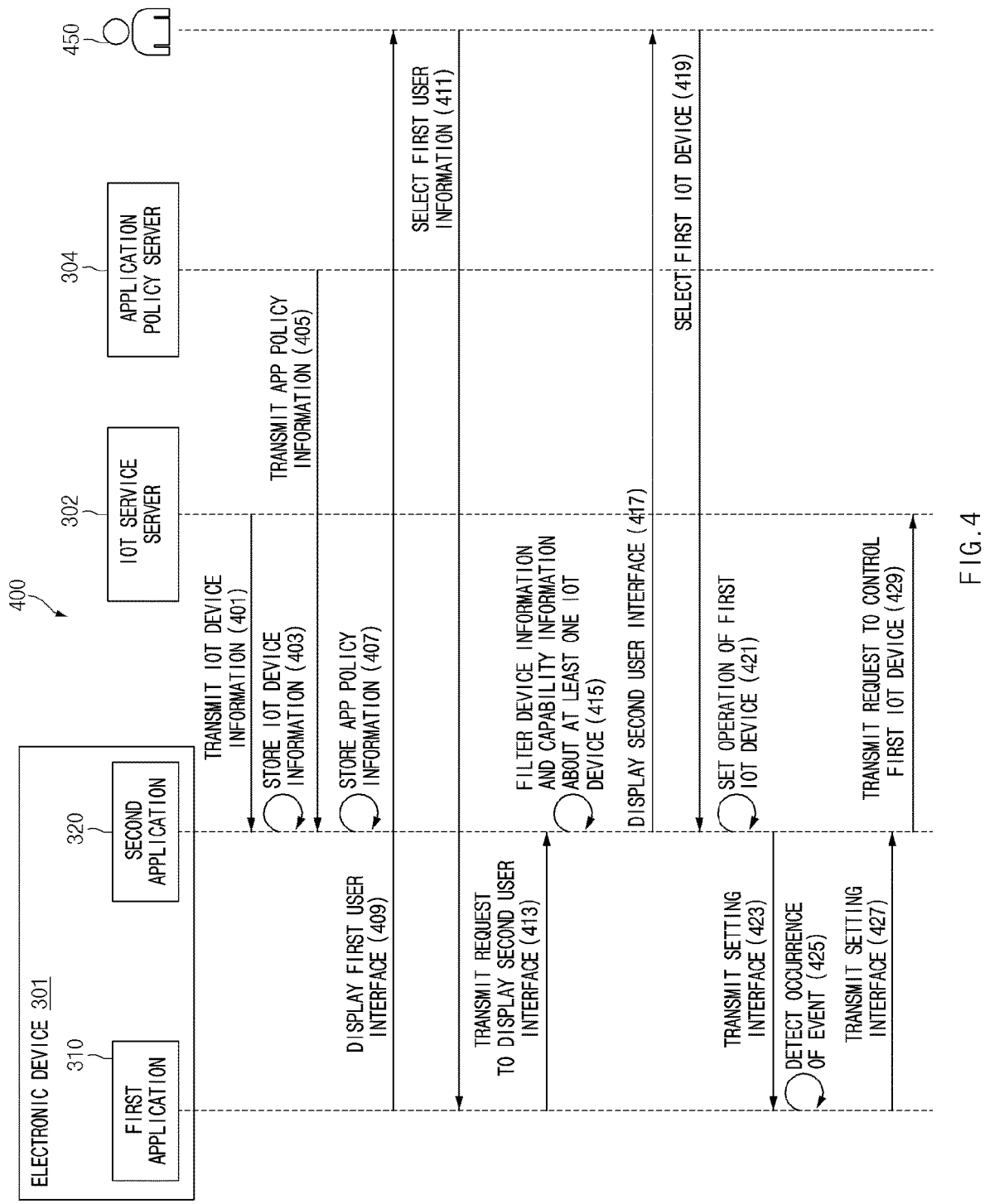
FIG. 4 is a signal flow diagram illustrating an example operation of an electronic device according to various embodiments.

Referring to FIG. 4, in operation 401, the second application 320 may receive IoT device information from the IoT service server 302. The second application 320 may receive device information and capability information of an IoT device registered with the IoT service server 302 from the IoT service server 302. For example, the device information and the capability information of the IoT device registered with the IoT service server 302 may include device information and capability information of an IoT device registered with at least one user account. In operation 403, the second application 320 may store the device information and the capability information of the IoT device, which are received from the IoT service server 302, in the devices & capabilities database 321.

For example, when the IoT device or information associated with the IoT device is added, corrected, or deleted from the IoT service server 302, the second application 320 may receive the device information and the capability information of the IoT device from the IoT service server 302. When the information associated with the IoT device stored in the IoT service server 302 is added, corrected, or deleted, the IoT service server 302 may transmit a notification to the electronic device 301. As another example, when the electronic device 301 is powered on, the second application 320 may receive the device information and the capability information of the IoT device from the IoT service server 302. As another example, when the electronic device 301 receives a user account from a user, the second application 320 may receive the device information and the capability information of the IoT device from the IoT service server 302. According to an embodiment, the second application 320 may receive the device information and the capability information of the IoT device from the IoT service server 302 and may update device information and capability information of the IoT device registered by the user, which are stored in the devices & capabilities database 321. When the electronic device 301 receives a notification of the addition, correction, or deletion of the information stored in the IoT service server 302 from the IoT service server 302, when the electronic device 301 is powered on, or when the electronic device 301 receives the user account, the second application 320 may receive the device information and the capability information of the IoT device from the IoT service server 302 and may update the device information and the capability information of the IoT device registered by the user, which are stored in the devices & capabilities database 321.

in operation 405, the second application 320 may receive app policy information from the application policy server 304. For example, the second application 320 may receive device information and capability information of an IoT device supported by at least one application (e.g., the first application 310) stored in the electronic device 301 from the application policy server 304. For example, the second application 320 may receive the device information and the capability information of the IoT device supported by the at least one application (e.g., the first application 310) from the application policy server 304 before the at least one application (e.g., the first application 310) is run. In operation 407, the electronic device 301 may store the device information and the capability information of the IoT device, which are received from the application policy server 304, in the app policy database 323.

According to an embodiment, the second application 320 may receive the device information and the capability information of the IoT device supported by the first application 310 from the application policy server 304 before the first application 310 is run. The IoT device supported by the first application 310 may include an IoT device which supports a capability associated with at least one capability provided by the first application 310. According to an embodiment, the second application 320 may receive the device information and the capability information about the IoT device which supports the capability associated with the at least one capability provided by the first application 310.

According to an embodiment, the electronic device 301 may receive a user input for running the first application 310 from the user before performing operation 409. As the user input for running the first application 310 is received, the electronic device 301 may run the first application 310.

According to an embodiment, the electronic device 301 may register an event which is an execution condition of the first capability provided by the first application 310 based on the user input. For example, when the first application 310 is a calendar application, the electronic device 301 may add a schedule to a specified date based on the user input. According to an embodiment, the electronic device 301 may set the first capability (e.g., a notification capability) to be executed when an event registered based on a setting input of the user occurs. For example, when the specified date corresponding to the added schedule arrives, the electronic device 301 may provide the user with a notification.

In operation 409, the first application 310 may display a first user interface on a display (e.g., a display module 160 of FIG. 1). According to an embodiment, the first user interface may include a user interface to which an operation to display a second user interface is mapped. According to an embodiment, the second user interface may be a user interface for setting a second capability of an IoT device, which is associated with the first capability of the first application 310, to operate.

In operation 411, the first application 310 may receive an input for selecting the first user interface from a user 450. According to an embodiment, the first application 310 may receive the input for selecting the first user interface, thus performing operation 413. In operation 413, the first application 310 may transmit a request to display the second user interface to the second application 320. According to an embodiment, the second application 320 may receive the request to display the second user interface, thus performing operation 415.

In operation 415, the second application 320 may filter the device information and the capability information about the at least one IoT device. According to an embodiment, the second application 320 may filter the device information and the capability information about the at least one IoT device which supports the capability associated with the first capability provided by the first application 310 based on the IoT device information registered with the server and the IoT device information supported by the application. The IoT device information registered with the server may include the device information and the capability information of the IoT device, which are stored in the devices & capabilities database 321. The IoT device information supported by the application may include the device information and the capability information of the IoT device, which are stored in the app policy database 323. According to an embodiment, the second application 320 may compare the pieces of device information and the pieces of capability information of the IoT device, which are respectively stored in the devices & capabilities database 321 and the app policy database 323, and may filter the device information and the capability information about the at least one IoT device which supports the capability associated with the first capability provided by the first application 310.

According to an embodiment, the second application 320 may identify the first application 310 which transmits the request to display the second user interface. The second application 320 may filter the device information and the capability information about the at least one IoT device which supports the capability associated with the first capability provided by the identified first application 310 among the pieces of device information and the pieces of capability information of the IoT device, which are stored in the devices & capabilities database 321. For example, when the first application 310 is the calendar application, the second application 320 may filter and obtain device information and capability information of at least one IoT device which supports the capability associated with the first capability provided by the calendar application among the pieces of device information and the pieces of capability information of the IoT device, which are stored in the devices & capabilities database 321.

According to the above-mentioned embodiment, the devices & capabilities database 321 may be updated when a user account is input to the electronic device 301. The second application 320 may identify the user account input to the electronic device 301. The second application 320 may receive and store device information and capability information of an IoT device registered with the identified user account from the IoT service server 302 in the devices & capabilities database 321. In operation 415, the second application 320 may filter the device information and the capability information about the at least one IoT device which supports the capability associated with the first capability provided by the first application 310 among the pieces of device information and the pieces of capability information of the IoT device registered with the user account.

According to an embodiment, the second application 320 may compare the device information and the capability information of the IoT device registered with the identified user account with the device information and the capability information of the IoT device supported by the identified first application and may filter and obtain the duplicated information. According to an embodiment, the filtered information may include the device information and the capability information about the at least one IoT device which supports the capability associated with the at the first capability provided by the first application 310. For example, when the IoT device registered with the identified user account includes a first IoT device and a second IoT device and when the IoT device supported by the identified first application 310 includes a first IoT device, the second application 320 may filter and obtain device information and capability information about the first IoT device.

In operation 417, the second application 320 may display the second user interface. The second user interface may include the device information and the capability information about the at least one IoT device, which are filtered in operation 415. According to an embodiment, the second user interface may include a user interface for setting the capability of the filtered at least one IoT device to operate. According to an embodiment, the second user interface may include a device list of the filtered at least one IoT device and a capability list including at least one capability of each IoT device. For example, the second application 320 may display a device list of the filtered at least one IoT device (e.g., a TV, a light, a speaker, and/or an air purifier) and may display a capability list including at least one capability (e.g., a power setting capability, a channel setting capability, a volume setting capability, and/or a magic screen capability) of the IoT device (e.g., the TV) selected in the device list, but not limited thereto. As another example, the second application 320 may display a list in a form where the device list and the capability list are integrated with each other. The list in the form where they are integrated with each other may include, for example, turning on a TV, turning on a light, and/or opening a blind.

In operation 419, the second application 320 may receive an input for selecting the first IoT device from the user 450. According to an embodiment, the second application 320 may receive an input for selecting the first IoT device among the at least one IoT device through the second user interface. The at least one IoT device may include an IoT device which supports the capability associated with the first capability provided by the first application 310. According to an embodiment, the second application 320 may receive an input for selecting at least one capability of the first IoT device. The second application 320 may receive an input for setting the at least one capability of the first IoT device.

In operation 421, the second application 320 may set an operation of the first IoT device. According to an embodiment, as the input for selecting the first IoT device is received, the second application 320 may set a second capability associated with the first capability provided by the first application 310 to operate. According to an embodiment, the second application 320 may set whether the second capability operates and an operation method of the second capability based on the input for selecting the first IoT device, the input for selecting the at least one capability of the first IoT device, and/or the input for setting the at least one capability of the first IoT device. For example, the second application 320 may set to turn on power of the TV and adjust volume of the TV to 20 by receiving the input for selecting the TV, the input for selecting the volume setting capability of the TV, and the input for setting the volume to 20 through the second user interface. According to an embodiment, as the event which is the execution condition of the first capability occurs, the second capability may be executed. According to an embodiment, the second application 320 may set to control the first IoT device to perform the second capability when the first capability is executed.

In operation 423, the second application 320 may transmit setting information to the first application 310. According to an embodiment, the second application 320 may transmit setting information about an operation of the first IoT device to the first application 310. For example, the second application 320 may encode the setting information and may transmit the encoded setting information to the first application 310. According to an embodiment, the first application 310 may store the setting information.

In operation 425, the first application 310 may detect occurrence of an event. The event may include the event which is the execution condition of the first capability provided by the first application 310. According to an embodiment, the first application 310 may detect occurrence of the event which is the execution condition of the first capability.

In operation 427, the first application 310 may transmit the setting information to the second application 320. For example, the first application 310 may detect the occurrence of the event which is the execution condition of the first capability, thus transmitting the setting information.

In operation 429, the second application 320 may transmit a request to control the first IoT device to the IoT service server 302. According to an embodiment, the second application 320 may control the second capability of the first IoT device, which is associated with the first capability, to operate based on the setting information transmitted from the first application 310. According to an embodiment, the second application 320 may determine whether the first IoT device is included in the IoT device registered with the IoT device service server 302 at the time of performing operation 429. According to the above-mentioned embodiment, because the device information and the capability information of the IoT device, which are stored in the devices & capabilities database 321 and are received from the IoT service server 302, are able to be updated, the second application 320 may determine whether the first IoT device is included in the devices & capabilities database 321 when performing operation 429. According to an embodiment, when it is determined that the first IoT device is included in the devices & capability database 321, the second application 320 may control the second capability of the first IoT device to operate. For example, the second application 320 may transmit a request for the first IoT device to perform the second capability to the IoT service server 302.

Hereinafter, a description will be given of a user interface displayed by an electronic device according to various embodiments with reference to FIG. 5.

Figure 5:
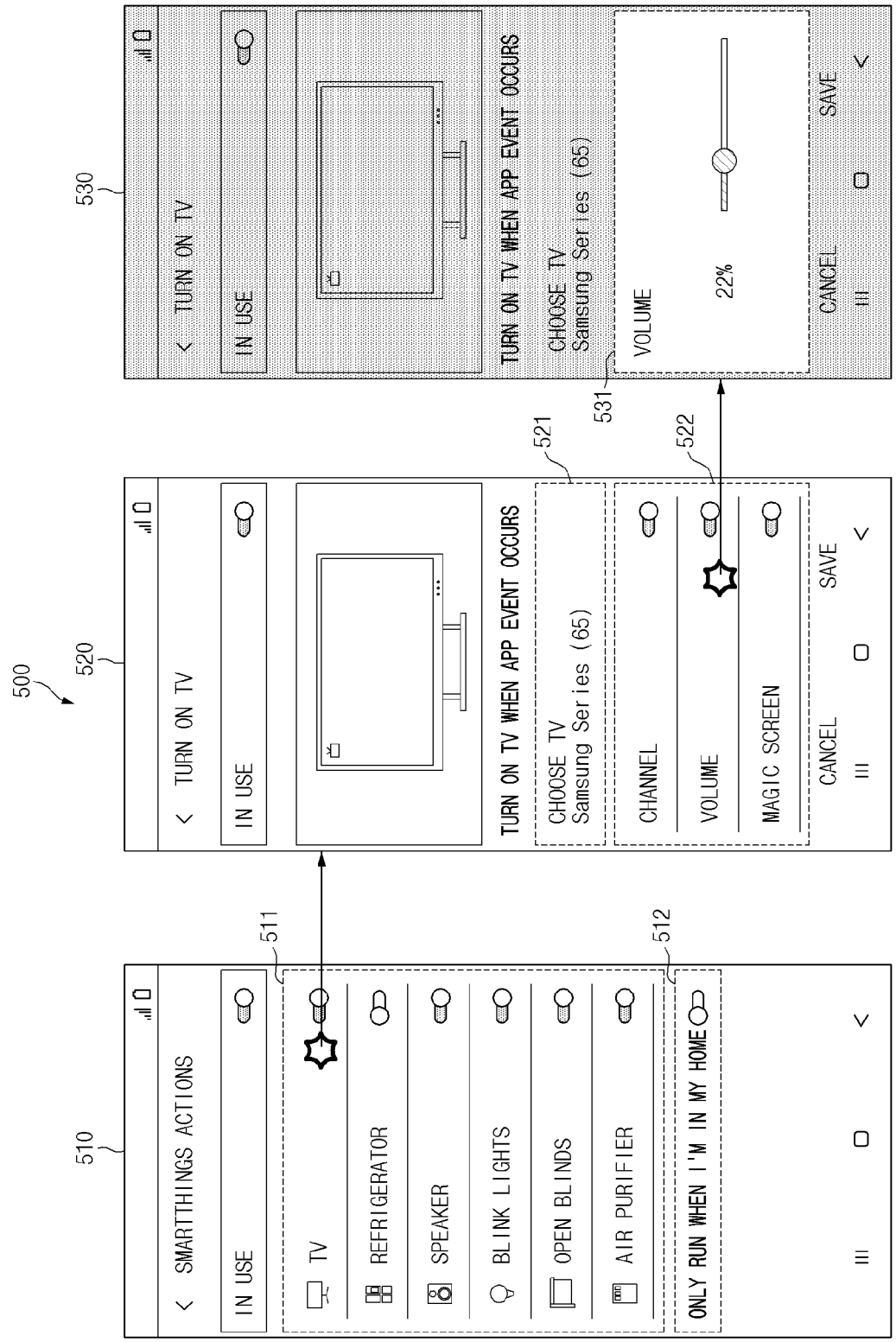
FIG. 5 is a diagram illustrating an example user interface displayed by an electronic device according to various embodiments.

FIG. 5 is a diagram 500 illustrating an example user interface displayed by an electronic device according to various embodiments. Operations of the electronic device, which will be described below, may be performed by an electronic device 301, a processor (e.g., a processor 120 of FIG. 1) of the electronic device 301, or a second application 320. The operations of the electronic device, which will be described below, may correspond to operations 417 to 421 described above with reference to FIG. 4.

Referring to FIG. 5, the electronic device may display a user interface for setting a second capability of an IoT device, which is associated with a first capability provided by a first application 310, to operate on a display (e.g., a display module 160 of FIG. 1) based on a user input. A user interface shown in FIG. 5 may include a first screen 510, a second screen 520, and a third screen 530.

According to an embodiment, the first screen 510 may include device information about filtered at least one IoT device. The first screen 510 may include, for example, a device list 511 of the filtered at least one IoT device. According to an embodiment, the device list 511 may include the at least one IoT device (e.g., a TV, a refrigerator, a speaker, a light, a blind, and/or an air purifier).

According to an embodiment, the first screen 510 may include option information 512 associated with whether to control an IoT device based on a location of the electronic device. The option information 512 may include an option to control at least one IoT device only when the electronic device has the same location information as the at least one IoT device.

According to an embodiment, when the event which is the execution condition of the first capability occurs after the input for selecting the option is received, the electronic device may determine whether the electronic device has the same location information as the at least one IoT device and may control the at least one IoT device depending on the determined result. For example, when having the same location information as the IoT device, the electronic device may control the IoT device to perform an operation according to setting information. When not having the same location information as the IoT device, the electronic device may fail to control the IoT device to perform the operation according to the setting information. Herein, that the electronic device has the same location information as the IoT device may include that the location information (e.g., GPS information) of the electronic device and the location information (e.g., GPS information) of the IoT device are the same as each other or that the electronic device has a specified error range determined that they are the same each other.

Meanwhile, when a user does not select the option, the electronic device may control the IoT device irrespective of the location of the electronic device. In this case, when the event which is the execution condition of the first capability occurs, the electronic device may control the IoT device to perform the operation according to the setting information although the electronic device does not have the same location information as the IoT device.

According to an embodiment, the user may select an IoT device (e.g., a TV) in the device list 511 included in the first screen 510. The electronic device may display the second screen 520 in response to receiving the user input for selecting the IoT device.

According to an embodiment, the second screen 520 may include device information 521 about the selected IoT device (e.g., the TV). The device information 521 may include, for example, a name and a spec of the IoT device. According to an embodiment, the second screen 520 may include capability information about the selected IoT device. The second screen 520 may include, for example, a capability list 522 including at least one capability (e.g., a channel setting capability, a volume setting capability, and/or a magic screen capability) of the selected IoT device (e.g., the TV).

According to an embodiment, the user may select a capability (e.g., a volume setting capability) in the capability list 522 included in the second screen 520. The electronic device may display the third screen 530 in response to receiving the user input for selecting the capability.

According to an embodiment, the third screen 530 may include a user interface (UI) 531 for setting the selected capability (e.g., the volume setting capability) in detail. For example, the user may specify desired volume through the UI 531, and the electronic device may set an operation of the IoT device depending on the specified volume.

According to an embodiment, the electronic device may set a second capability of the IoT device, which is associated with the first capability provided by a first application 310, to operate based on the user input. For example, as the event which is the execution condition of the first capability occurs based on the user input through the first to third screens 510 to 530, the electronic device may set to turn on the power of the TV and adjust volume of the TV to 22%.

Hereinafter, a more detailed description will be given of an operation of differently displaying a user interface depending on an application in an electronic device according to an embodiment with reference to FIGS. 6A and 6B.

Figure 6A:
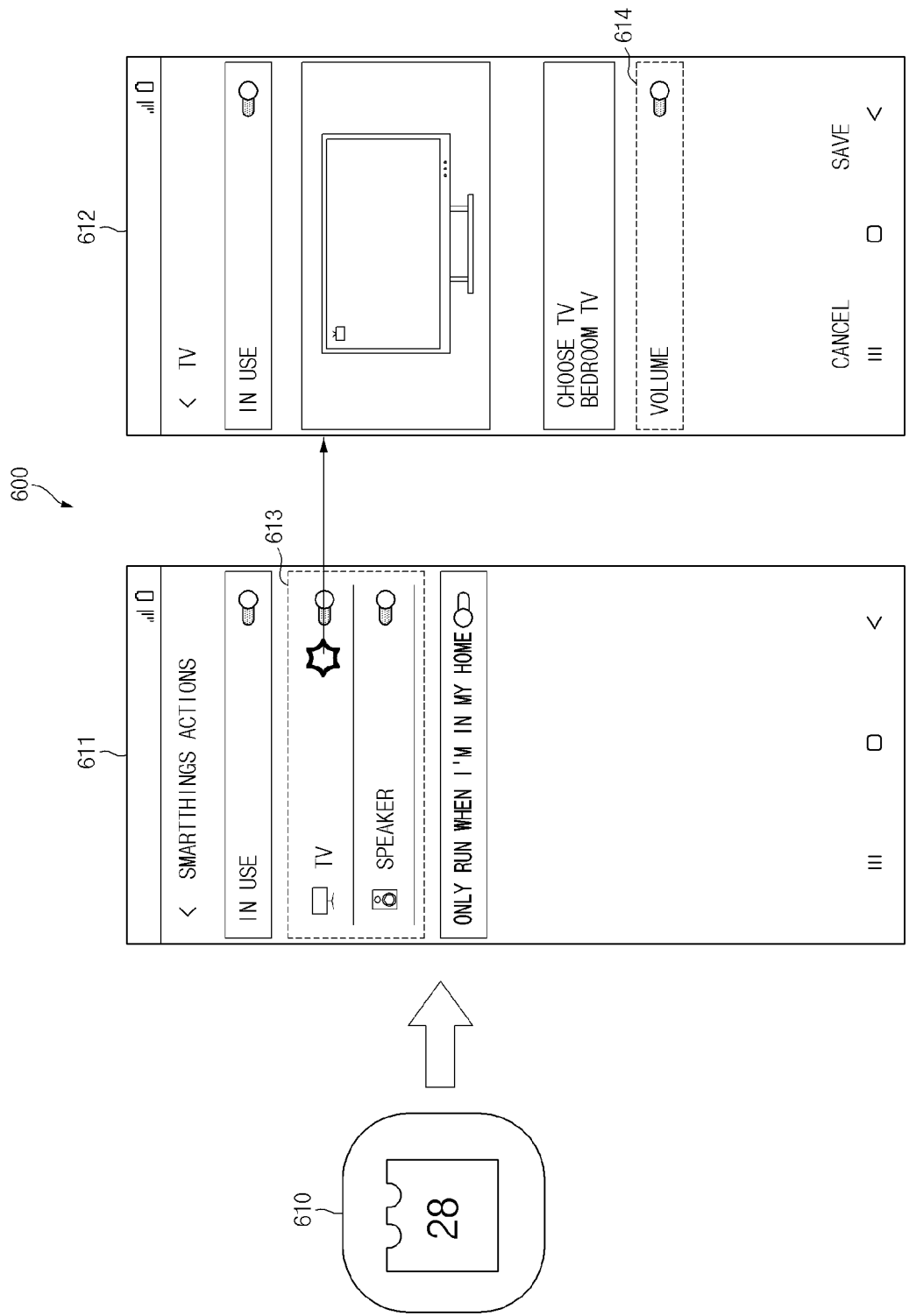
FIGS. 6A and 6B are diagrams illustrating an example user interface displayed by an electronic device according to various embodiments.
Figure 6B:
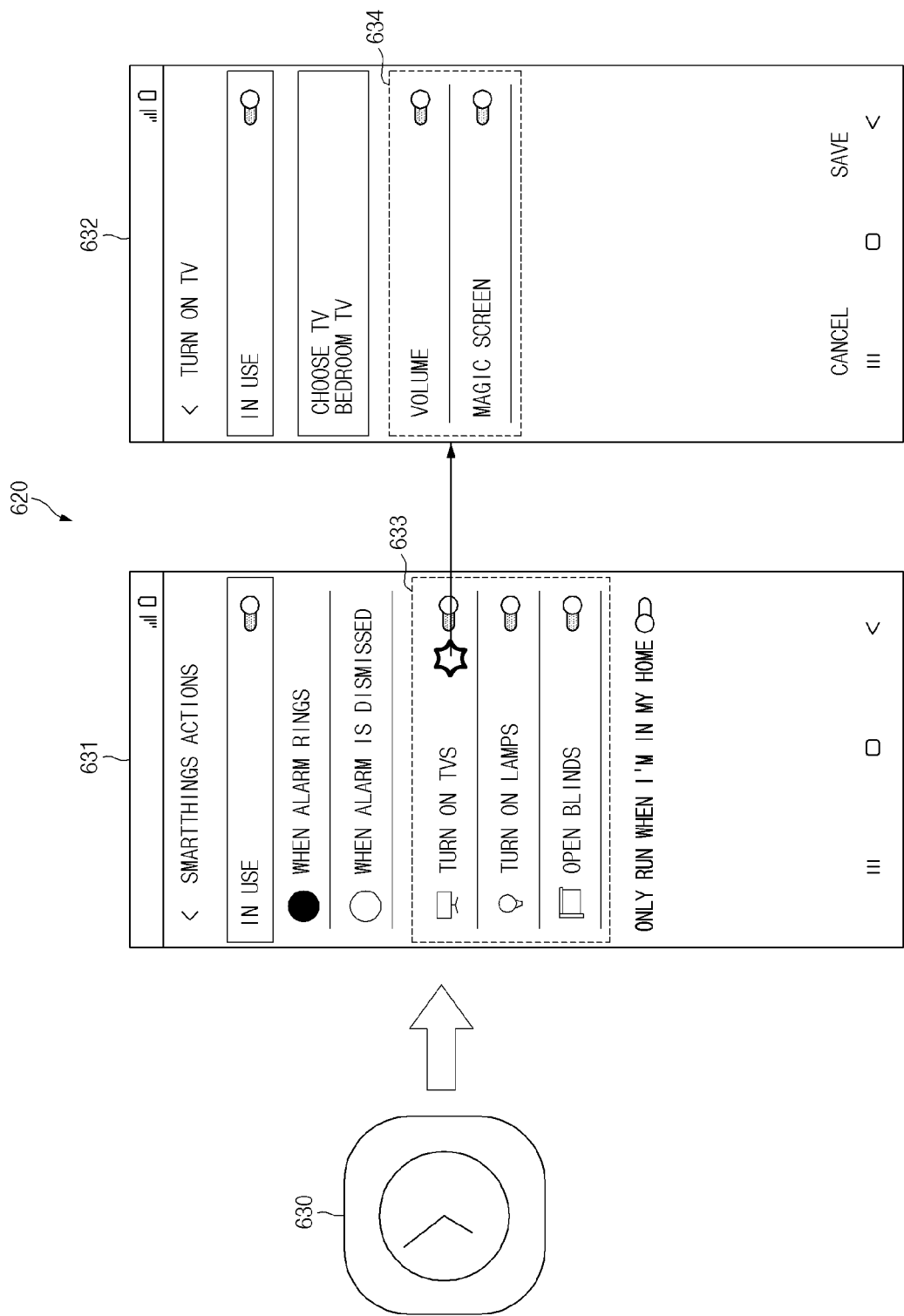

FIGS. 6A and 6B are diagrams 600 and 620 illustrating an example user interface displayed by an electronic device according to various embodiments. Operations of the electronic device, which will be described below, may be performed by an electronic device 301, a processor (e.g., a processor 120 of FIG. 1) of the electronic device 301, or a second application 320. The operations of the electronic device, which will be described below, may correspond to operations 415 to 419 described above with reference to FIG. 4.

Referring to FIGS. 6A and 6B, the electronic device may identify an application which transmits a request to display a user interface for setting a second capability of an IoT device, which is associated with a first capability provided by an application (e.g., a first application 310), to operate. The electronic device may filter device information and capability information of an IoT device which supports a capability associated with the first capability provided by the identified application among pieces of device information and pieces of capability information of IoT devices registered with a server (e.g., an IoT service server 302 of FIG. 3). The electronic device may generate and display a user interface based on the filtered device information and the filtered capability information of the at least one IoT device on a display (e.g., a display module 160 of FIG. 1).

Referring to FIG. 6A, the electronic device may identify that the application is a calendar application 610. The electronic device may filter device information and capability information of an IoT device which supports a capability associated with the first capability of the calendar application 610 among the pieces of device information and the pieces of capability information of the IoT devices registered with the server. For example, the IoT device which supports the capability associated with the first capability of the calendar application 610 may include a TV and a speaker, and the electronic device may generate a first screen 611 including a device list 613 of the IoT device including the TV and the speaker.

According to an embodiment, the electronic device may generate a screen including each of capability lists including a capability of each of IoT devices included in the device list 613. For example, a second screen 612 including a capability list 614 including a capability of the TV and a screen (not shown) including a capability list including a capability of the speaker may be generated. For example, the capability list 614 may include a volume adjustment capability.

According to an embodiment, the electronic device may identify that an application 310 is the calendar application 610, thus displaying the first screen 611 including the device list 613 of the IoT device which supports the capability associated with the first capability of the calendar application 610 among the IoT devices registered with the server on the display. For example, the electronic device may display the second screen 612 including the capability list 614 including the capability (e.g., the volume adjustment capability) of the TV, which is associated with the first capability of the calendar application 610, on the display in response to receiving the user input for selecting the TV in the device list 613.

Referring to FIG. 6B, the electronic device may identify that the application is a clock application 630. The electronic device may filter device information and capability information of an IoT device which supports a capability associated with the first capability of the clock application 630 among the pieces of device information and the pieces of capability information of the IoT devices registered with the server. For example, the IoT device which supports the capability associated with the first capability of the clock application 630 may include a TV, a lamp, and a blind, and the electronic device may generate a first screen 631 including a device list 633 of the IoT device including the TV, the lamp, and the blind.

According to an embodiment, the electronic device may generate a screen including each of capability lists including a capability of each of IoT devices included in the device list 633. For example, a second screen 632 including a capability list 634 including a capability of the TV, a screen (not shown) including a capability list including a capability of the lamp, and a screen (not shown) including a capability list including a capability of the blind may be generated. For example, the capability list 634 may include a volume adjustment capability and a magic screen capability.

According to an embodiment, the electronic device may identify that the application is the clock application 630, thus displaying the first screen 631 including the device list 633 of the IoT device which supports the capability associated with the first capability of the clock application 630 among the IoT devices registered with the server on the display. For example, the electronic device may display the second screen 632 including the capability list 614 including the capability (e.g., the volume adjustment capability and the magic screen capability) of the TV, which is associated with the first capability of the clock application 630, on the display in response to receiving the user input for selecting the TV in the device list 633.

According to the above-mentioned embodiment, the electronic device may differently display a user interface for setting the second capability of the IoT device, which is associated with the first capability provided by the application, to operate depending on an application which transmits a request to display the user interface. The electronic device may display an IoT device which supports a capability associated with the first capability of an application where the user registers the event which is the execution condition of the first capability and a user interface generated based on the capability depending on the corresponding application, thus improving a user experience for linking an IoT device for each scenario of various applications.

Hereinafter, a more detailed description will be given of an operation of differently displaying a user interface depending on a user account in an electronic device according to an embodiment with reference to FIG. 7.

Figure 7:
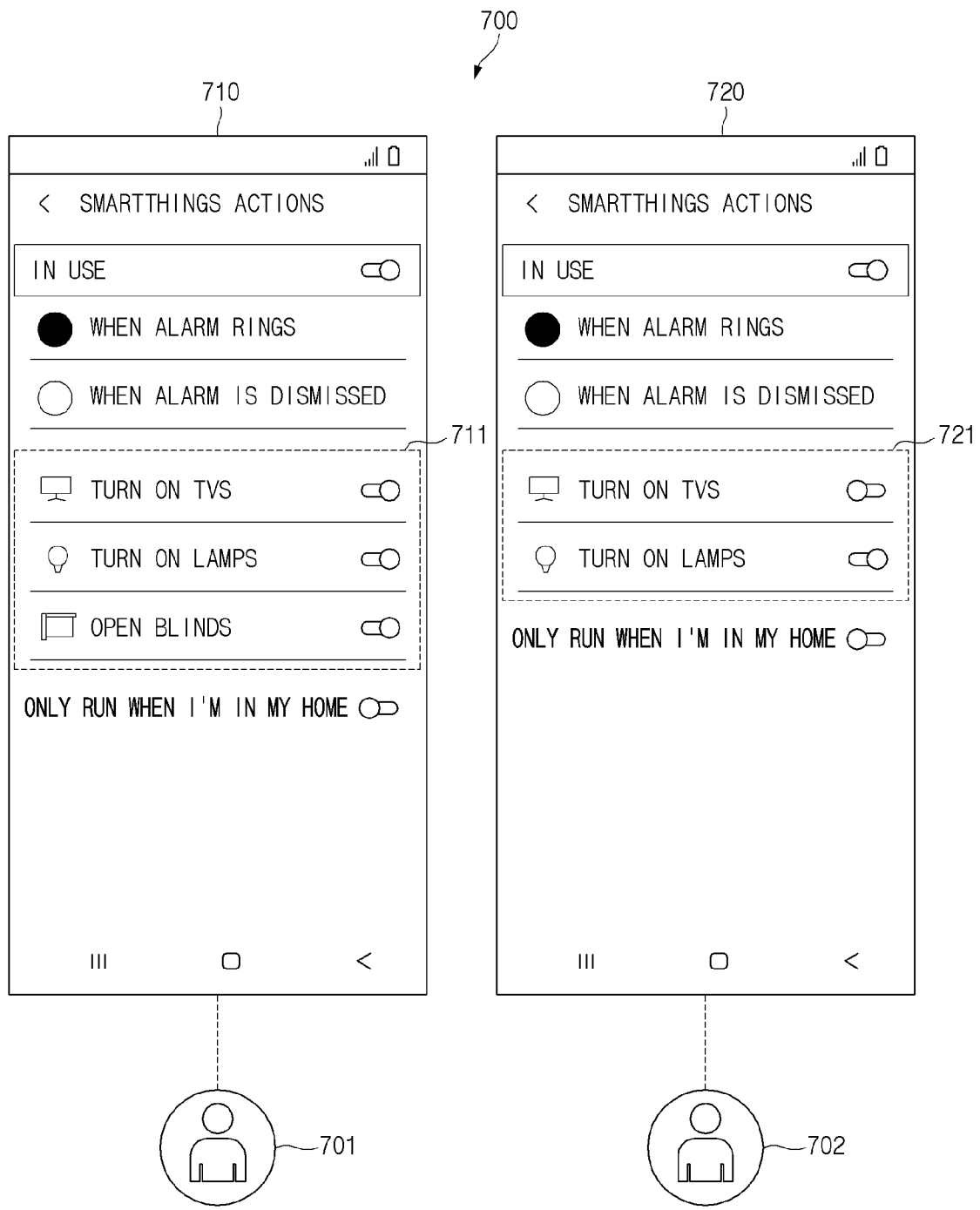
FIG. 7 is a diagram illustrating an example user interface displayed by an electronic device according to various embodiments.

FIG. 7 is a diagram 700 illustrating an example user interface displayed by an electronic device according to various embodiments. Operations of the electronic device, which will be described below, may be performed by an electronic device 301, a processor (e.g., a processor 120 of FIG. 1) of the electronic device 301, or a second application 320. The operations of the electronic device, which will be described below, may correspond to operations 415 to 419 described above with reference to FIG. 4.

According to an embodiment, the electronic device may identify a user account input to the electronic device. The electronic device may identify an application which transmits a request to display a user interface for setting a second capability of an IoT device, which is associated with a first capability provided by an application (e.g., a first application 310), to operate. The electronic device may filter device information and capability information about an IoT device supported by the identified application among pieces of device information and pieces of capability information of IoT devices registered with the identified user account. The electronic device may generate and display a user interface based on the filtered device information and the filtered capability information of the at least one IoT device on a display (e.g., a display module 160 of FIG. 1).

Referring to FIG. 7, for example, the electronic device may identify that the user account input to the electronic device is a first user account 701. The electronic device may identify that an application which transmits a request to display a user interface shown in FIG. 7 is a first application. The electronic device may filter device information and capability information of an IoT device which supports a capability associated with a first capability of the first application among pieces of device information and pieces of capability information of IoT devices registered with the first user account 701. For example, the IoT devices registered with the first user account 701 may include a TV, a lamp, and a blind, and the IoT device which supports the capability associated with the first capability of the first application may include the TV, the lamp, and the blind. In this case, the electronic device may generate a first screen 710 including a device list 711 of the IoT devices including the TV, the lamp, and the blind.

As another example, the electronic device may identify that the user account input to the electronic device is a second user account 702. The electronic device may filter the device information and the capability information of the IoT device which supports the capability associated with the first capability of the first application among pieces of device information and pieces of capability information of IoT devices registered with the second user account 702. For example, the IoT devices registered with the second user account 702 may include a TV and a lamp and may fail to include a blind. For example, the IoT device which supports the capability associated with the first capability of the first application may include the TV, the lamp, and the blind. In this case, the electronic device may generate a second screen 720 including a device list 721 of the IoT devices including the TV and the lamp.

According to an embodiment, the electronic device may identify that the user account input to the electronic device is the first user account 701, thus displaying the first screen 710 including the device list 711 of the IoT device which supports the capability associated with the first capability of the first application among the IoT devices registered with the first user account 701 on the display. For example, the device list 711 may include the TV, the lamp, and the blind. The electronic device may identify that the user account is the second user account 702, thus displaying the second screen 720 including the device list 721 of the IoT device which supports the capability associated with the first capability of the first application among the IoT devices registered with the second user account 702 on the display. For example, the device list 721 may include the TV and the lamp.

According to the above embodiment, the electronic device may differently display a user interface for setting a second capability of the IoT device, which is associated with the first capability provided by the application, to operate depending on the user account input to the electronic device. The electronic device may display a user interface generated based on the IoT device registered with a user account and a capability thereof, thus providing a personalized user experience for linking the IoT device for each user account.

Hereinafter, a more detailed description will be given of an operation of controlling an IoT device to output a notification in an electronic device according to an embodiment with reference to FIGS. 8A and 8B.

Figure 8A:
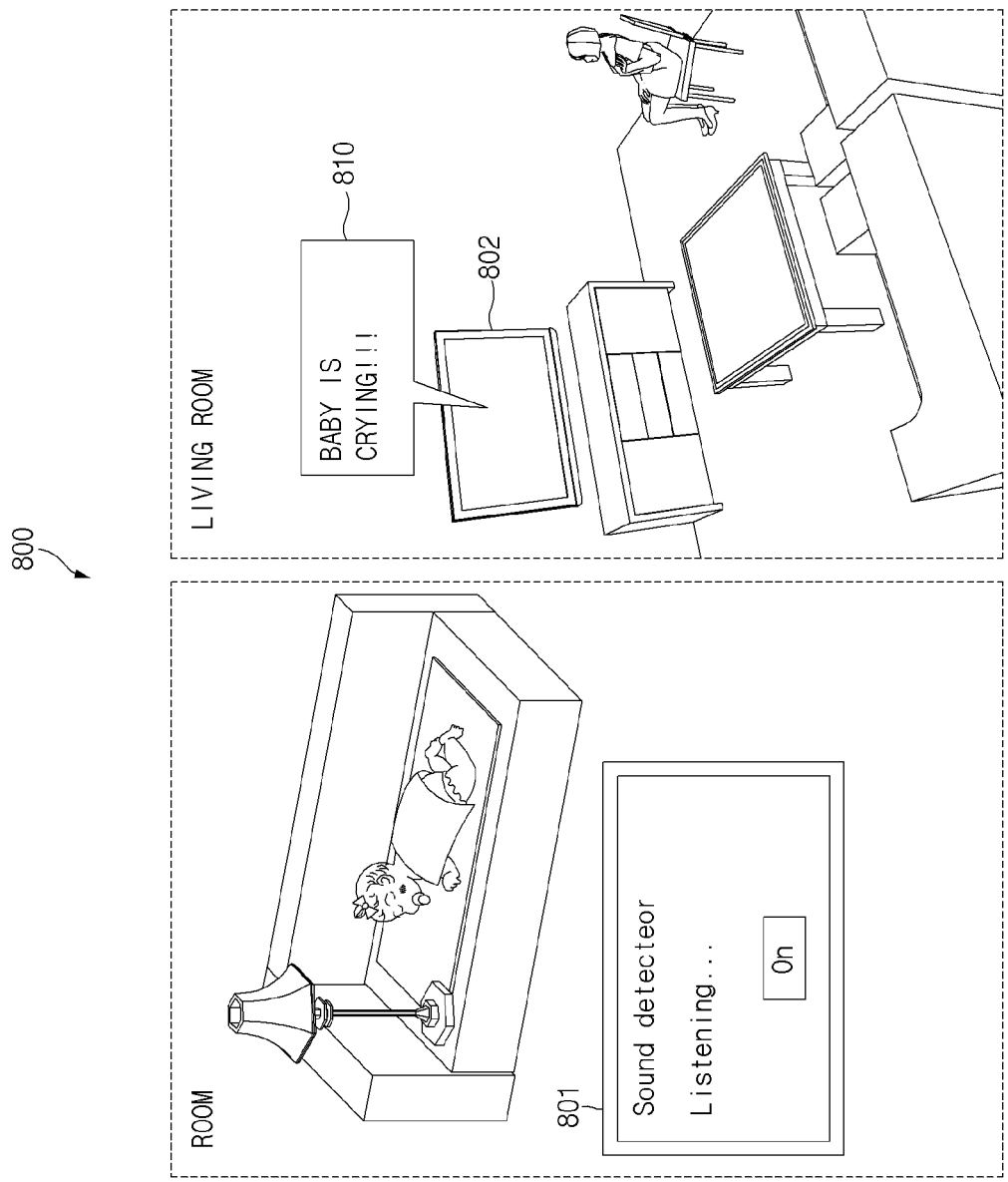
FIGS. 8A and 8B are diagrams illustrating an example operation of an electronic device according to various embodiments.
Figure 8B:
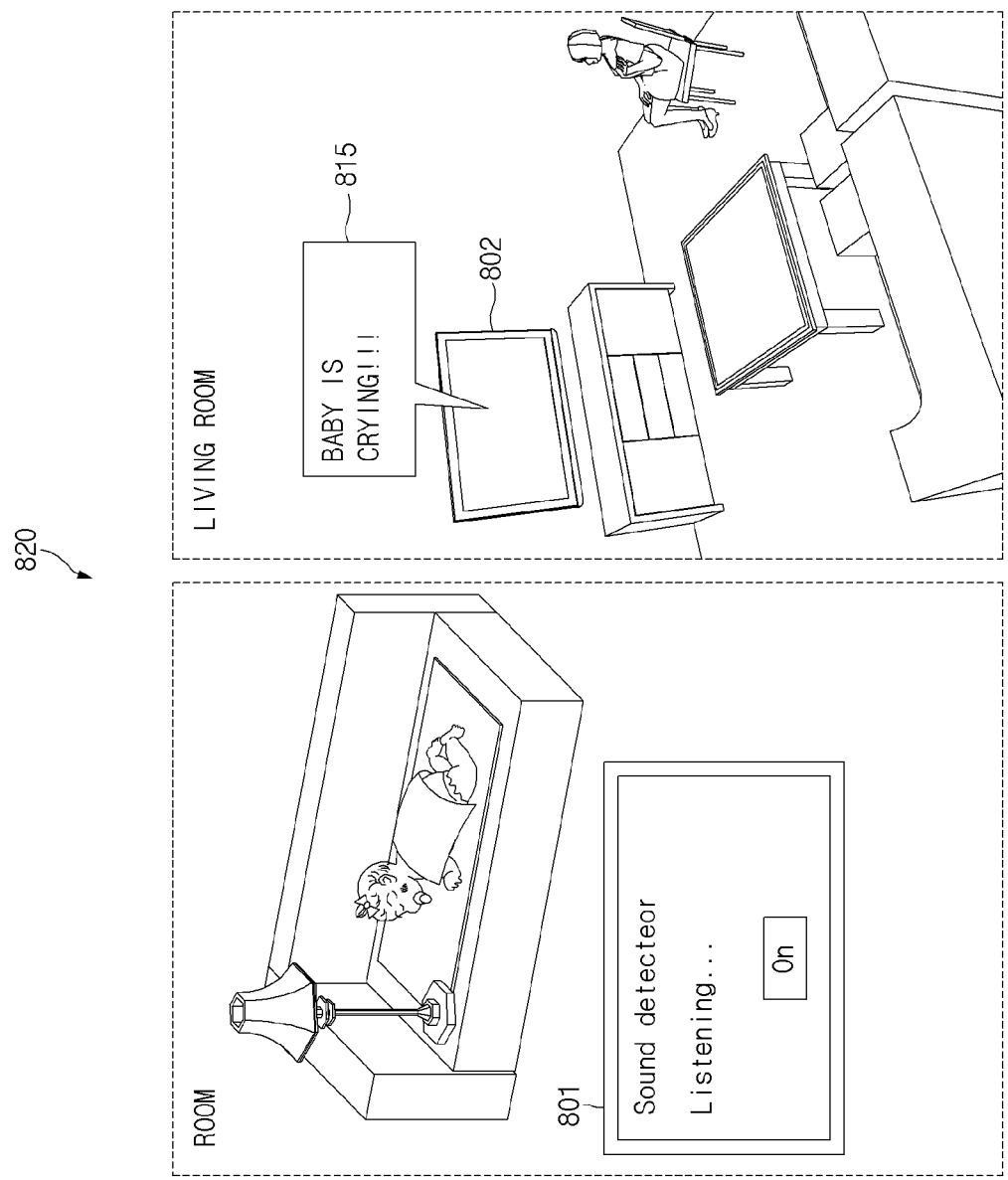

FIGS. 8A and 8B are diagrams 800 and 820 illustrating an example operation of an electronic device according to various embodiments. Operations of an electronic device 801 (e.g., an electronic device 301 of FIG. 3), which will be described below, may be performed by a processor (e.g., a processor 120 of FIG. 1) of the electronic device 801. The operations of the electronic device, which will be described below, may correspond to operations 425 to 429 described above with reference to FIG. 4.

Referring to FIGS. 8A and 8B, for example, an electronic device 801 may be running an application (e.g., a sound detector) which is located in the room and detects a sound in the room. According to an embodiment, the sound detector application may detect a sound, thus performing a notification capability. According to an embodiment, the electronic device 801 may be configured to control a specified IoT device to output a notification as the sound detector application detects the sound. The electronic device 801 may detect a sound by the sound detector application, thus controlling the specified IoT device to output a notification. According to an embodiment, the specified IoT device may be set by the electronic device based on a user input received through a user interface shown in FIG. 5. For example, the specified IoT device may include a TV 802 in the living room. For example, the TV 802 may output a notification using a voice through a speaker or may visually output the notification on a display.

According to an embodiment, the electronic device 801 may control an IoT device to output a notification based on a language set in the electronic device 801 or a setting language of the IoT device. For example, the language set in the electronic device 801 may be English, and the setting language of the TV 802 may be Korean. The embodiment shown in FIG. 8A corresponds to the case where the electronic device 801 controls the IoT device to output the notification based on the setting language of the IoT device. The embodiment shown in FIG. 8B corresponds to the case where the electronic device 801 controls the IoT device to output the notification based on the setting language of the electronic device 801.

Referring to FIG. 8A, the electronic device 801 may control the TV 802 to output a notification 810 that the baby is crying with Korean which is the setting language of the TV 802 in response to detecting the crying of the baby by the sound detector application. Referring to FIG. 8B, the electronic device 801 may control the TV 802 to output a notification 815 that the baby is crying with English which is the language set in the electronic device 801 in response to detecting the crying of the baby by the sound detector application.

Hereinafter, a more detailed description will be given of an operation of setting an operation of an IoT device by a clock application and an operation of controlling the IoT device based on setting information in an electronic device according to an embodiment with reference to FIG. 9.

Figure 9:
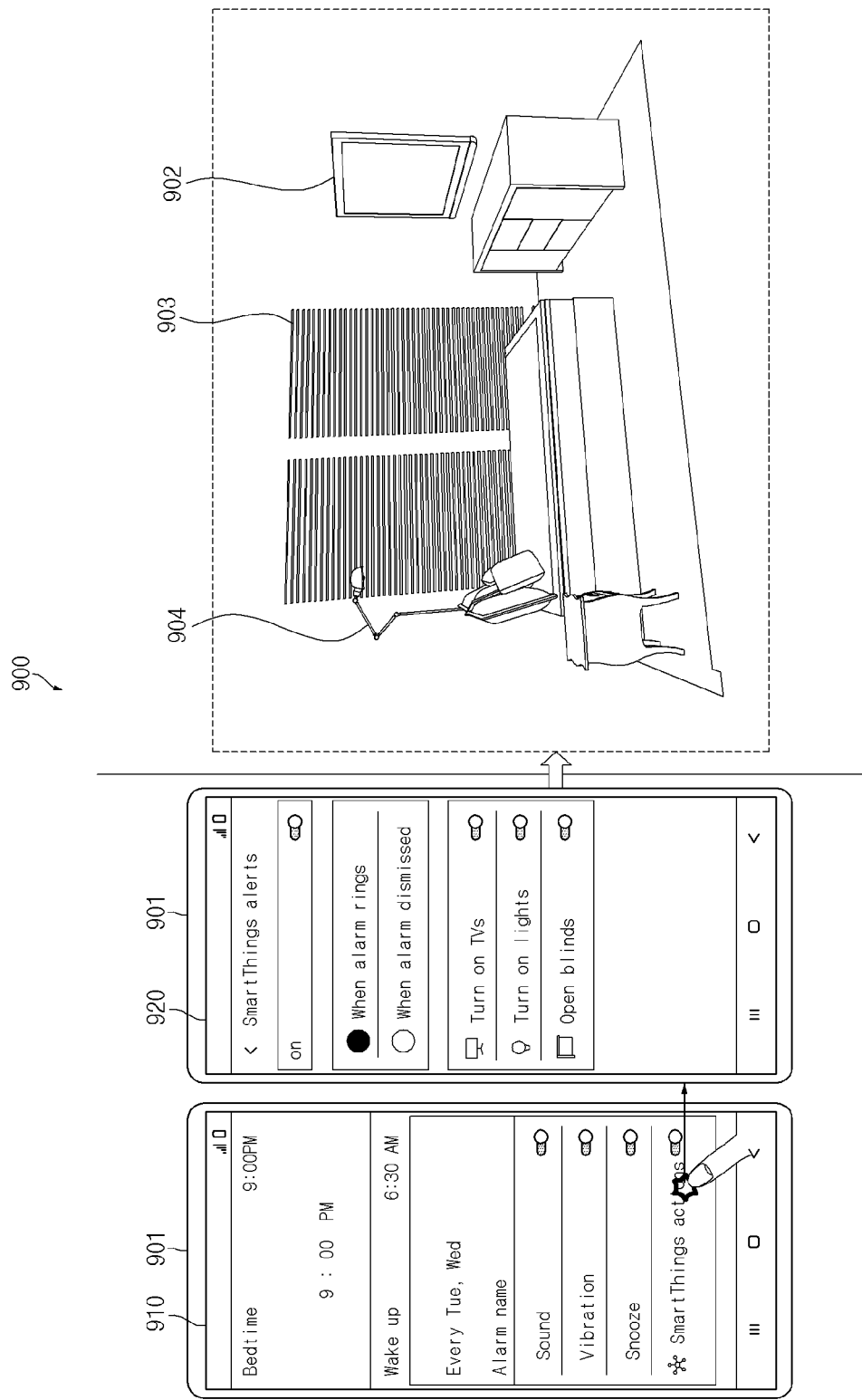
FIG. 9 is a diagram illustrating an example operation of an electronic device according to various embodiments.

FIG. 9 is a diagram 900 illustrating an example operation of an electronic device according to various embodiments. Operations of an electronic device 901 (e.g., an electronic device 301 of FIG. 3), which will be described below, may be performed by a processor (e.g., a processor 120 of FIG. 1) of the electronic device 901. The operations of the electronic device, which will be described below, may correspond to operations 409 to 429 described above with reference to FIG. 4.

Referring to FIG. 9, the electronic device 901 may be running a clock application. The electronic device 901 may display a first user interface 910 for setting an alarm. The electronic device 901 may set an alarm based on a user input received through the first the user interface 910. According to an embodiment, the first user interface 910 may include an item (e.g., SmartThings actions) to which an operation of displaying a second user interface 920 is mapped. The second user interface 920 may include a user interface for setting an operation of at least one IoT device which supports a capability associated with a capability of a sound detector application. The electronic device 901 may display the second user interface 920 based on a user input for selecting the item. The electronic device 901 may filter device information and capability information about an IoT device which supports a capability associated with an alarm capability of the clock application and may display the second user interface 920 based on the filtered information. The electronic device 901 may set an operation of at least one IoT device (e.g., a TV 902, a blind 903, and a light 904) based on a user input received through the second user interface 920. For example, the electronic device 901 may set to control to turn on the TV 902, open the blind 903, and turn on the light 904 when the alarm set through the first user interface 910 rings, based on the user input received through the second user interface 920. For example, when the time set such that the alarm rings arrives, the electronic device 901 may transmit a control request for the TV 902, the blind 903, and the light 904 to an IoT service server (e.g., an IoT service server 302 of FIG. 3). The IoT service server may control to turn on the TV 902, open the blind 903, and turn on the light 904 based on the control request received from the electronic device 901. For example, the IoT service server may control the TV 902, the blind 903, and the light 904 to operate sequentially or at the same time.

Hereinafter, a more detailed description will be given of an operation of setting an operation of an IoT device by a sound detector application and an operation of controlling the IoT device based on setting information in an electronic device according to an embodiment with reference to FIG. 10.

Figure 10:
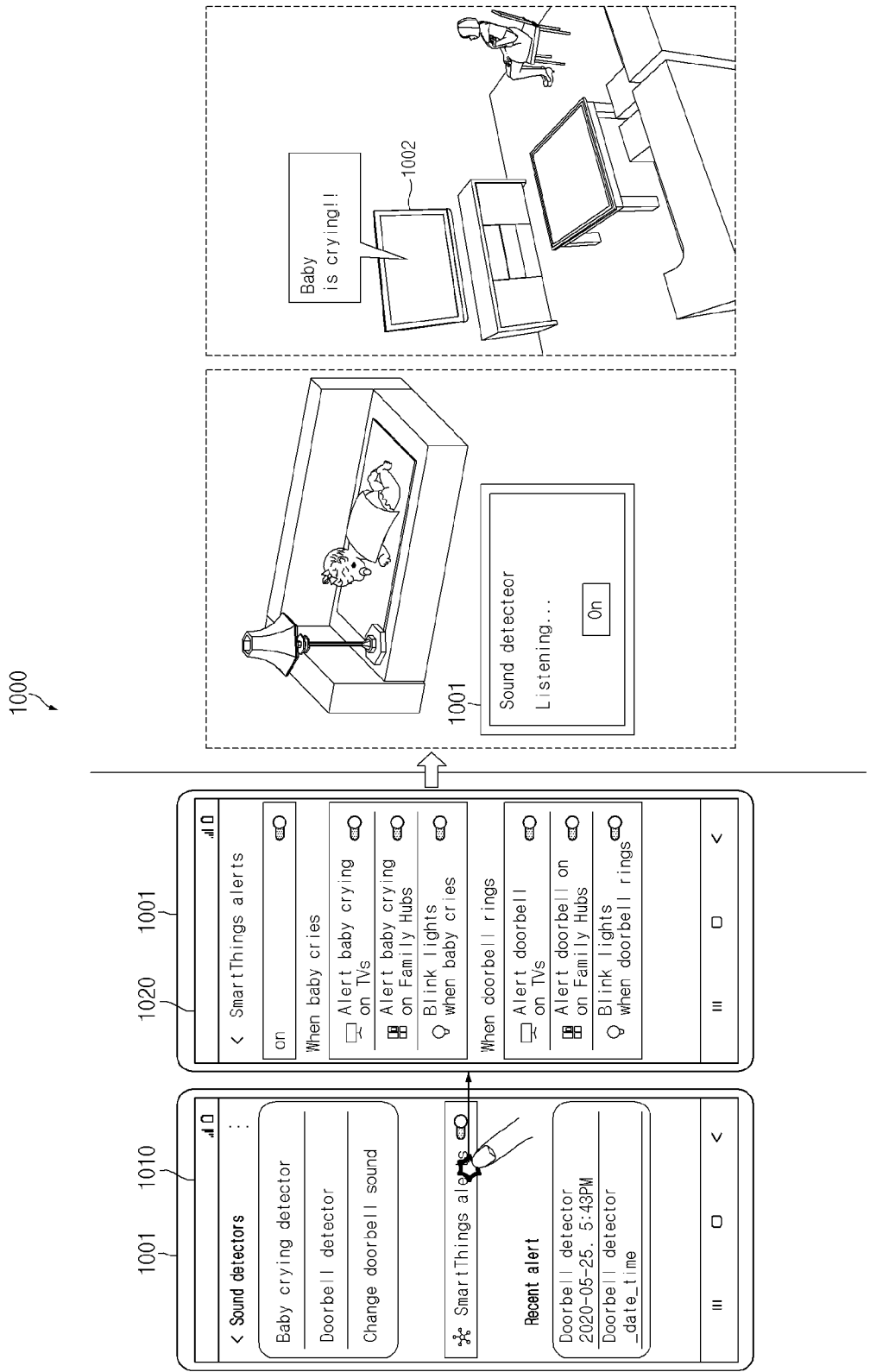
FIG. 10 is a diagram illustrating an example operation of an electronic device according to various embodiments.

FIG. 10 is a diagram 1000 illustrating an example operation of an electronic device according to various embodiments. Operations of an electronic device 1001 (e.g., an electronic device 301 of FIG. 3), which will be described below, may be performed by a processor (e.g., a processor 120 of FIG. 1) of the electronic device 1001. The operations of the electronic device, which will be described below, may correspond to operations 409 to 429 described above with reference to FIG. 4.

Referring to FIG. 10, the electronic device 1001 may be running a sound detector application. The electronic device 1001 may display a first user interface 1010 for setting a sound detection capability. The electronic device 1001 may set an alarm based on a user input received through the first the user interface 1010. According to an embodiment, the first user interface 1010 may include an item (e.g., Smart-Things alerts) to which an operation of displaying a second user interface 1020 is mapped. The second user interface 1020 may include a user interface for setting an operation of at least one IoT device which supports a capability associated with a capability of the sound detector application. The electronic device 1001 may display the second user interface 1020 based on a user input for selecting the item. The electronic device 1001 may filter device information and capability information of an IoT device which supports a capability associated with a notification capability according to the sound detection of the sound detector application and may display the second user interface 1020 based on the filtered information. The electronic device 1001 may set an operation of at least one IoT device (e.g., a TV 1002) based on a user input received through the second user interface 1020. For example, the electronic device 1001 may set the TV 1002 to output a notification when crying of a baby set through the first user interface 1010 is detected, based on the user input received through the second user interface 1020. For example, when detecting the crying of the baby, the electronic device 1001 may output a notification sound and may transmit a control request for the TV 1002 to an IoT service server (e.g., an IoT service server 302 of FIG. 3). The IoT service server may output a notification that the baby is crying through a speaker of the TV 1002 based on the control request received from the electronic device 1001.

Hereinafter, a more detailed description will be given of an operation of setting an operation of an IoT device by a calendar application and an operation of controlling the IoT device based on setting information in an electronic device according to an embodiment with reference to FIG. 11.

Figure 11:
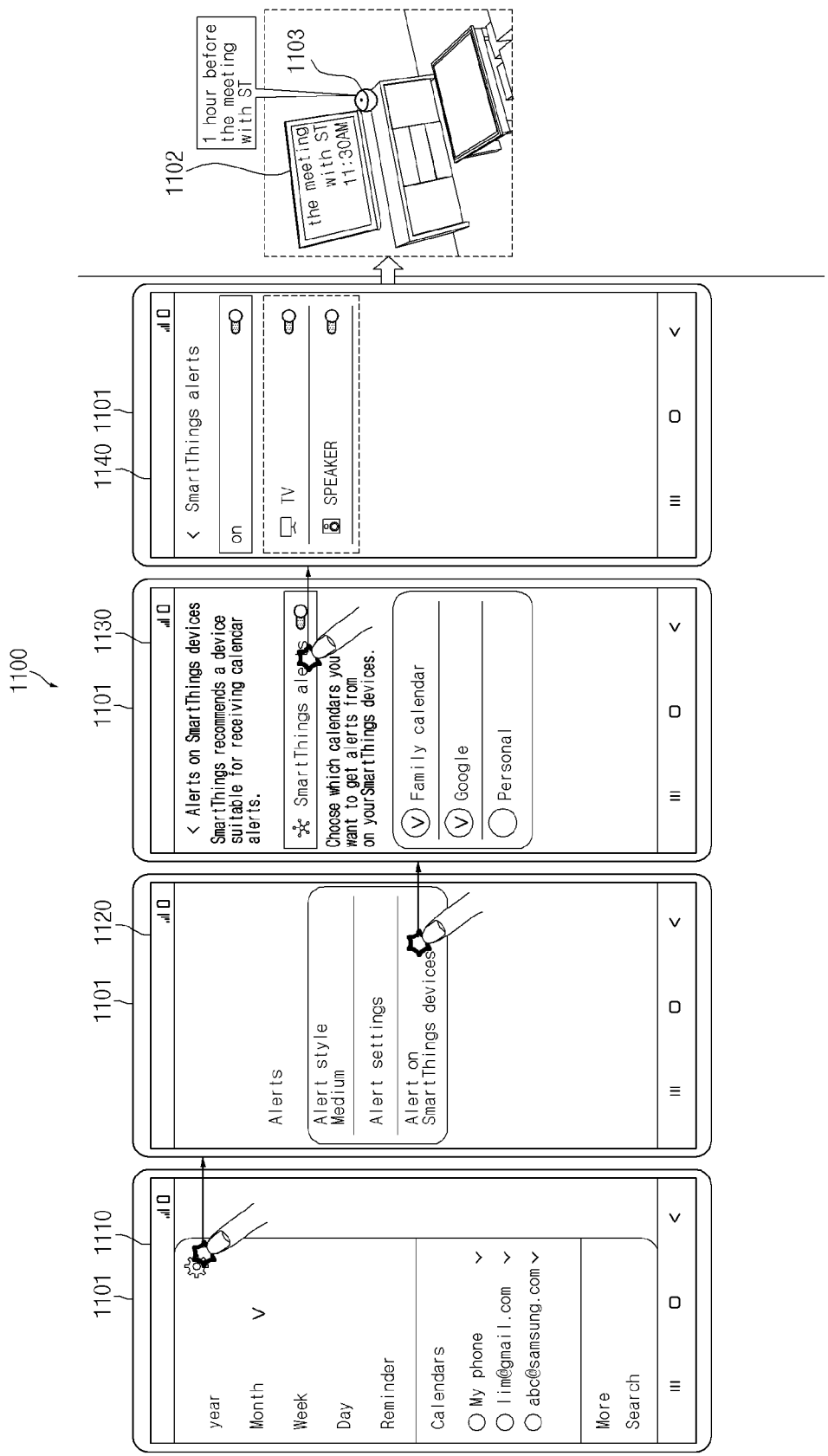
FIG. 11 is a diagram illustrating an example operation of an electronic device according to various embodiments.

FIG. 11 is a diagram 1100 illustrating an example operation of an electronic device according to various embodiments. Operations of an electronic device 1101 (e.g., an electronic device 301 of FIG. 3), which will be described below, may be performed by a processor (e.g., a processor 120 of FIG. 1) of the electronic device 1101. The operations of the electronic device, which will be described below, may correspond to operations 409 to 429 described above with reference to FIG. 4.

Referring to FIG. 11, the electronic device 1101 may be running a calendar application. The electronic device 1101 may display a first user interface 1110 for adding a schedule. The electronic device 1101 may display a second user interface 1120 associated with a notification setting of the calendar application based on a user input received through the first user interface 1110. According to an embodiment, the second user interface 1120 may include an item (e.g., Alert on SmartThings devices) to which an operation of displaying a third user interface 1130 is mapped. The third user interface 1130 may include a user interface for setting an operation of at least one IoT device which supports a capability associated with a notification capability of the calendar application. The electronic device 1101 may display the third user interface 1130 based on a user input for selecting the item. The electronic device 1101 may filter device information and capability information of an IoT device which supports a capability associated with an alarm capability of the calendar application and may display the third user interface 1130 based on the filtered information. The electronic device 1101 may set an operation of at least one IoT device (e.g., a TV 1102 and a speaker 1103) based on a user input received through the fourth user interface 1140. For example, the electronic device 1101 may set the TV 1102 and the speaker 1103 to output a notification when a specified date arrives depending on a schedule added through the first user interface 1110, based on the user input received through the fourth user interface 1140. For example, when the specified date arrives, the electronic device 1101 may output a notification and may transmit a control request for the TV 1102 and the speaker 1103 to an IoT service server (e.g., an IoT service server 302 of FIG. 3). The IoT service server may output a notification for a schedule through the TV 1102 and the speaker 1103 based on the control request received from the electronic device 1101. For example, the IoT service server may control the TV 1102 and the speaker 1103 to operate sequentially or at the same time.

Hereinafter, a more detailed description will be given of an operation of setting an operation of an IoT device by a weather application and an operation of controlling the IoT device based on setting information in an electronic device according to an embodiment with reference to FIG. 12.

Figure 12:
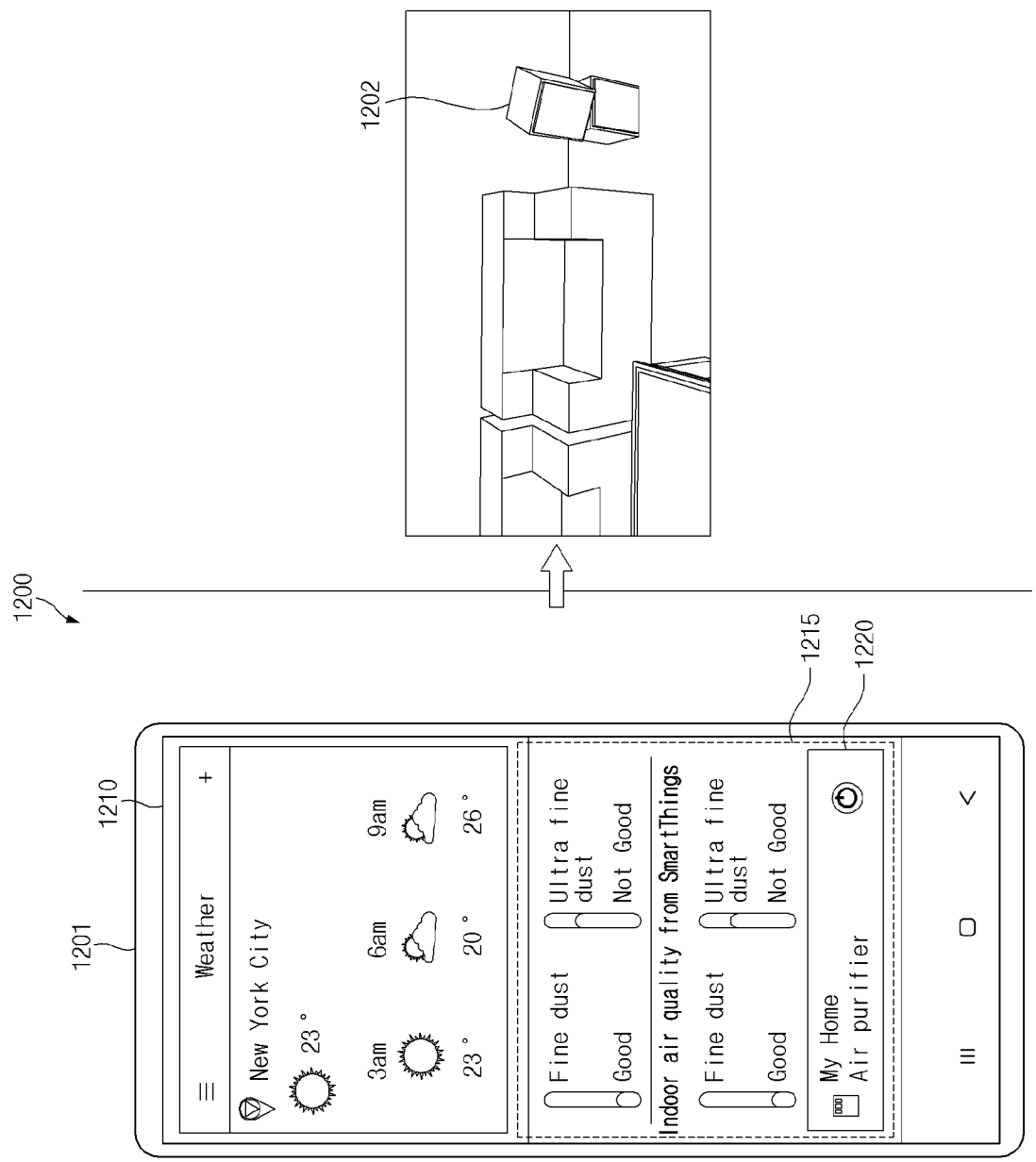
FIG. 12 is a diagram illustrating an example operation of an electronic device according to various embodiments.

FIG. 12 is a diagram 1200 illustrating an example operation of an electronic device according to various embodiments. Operations of an electronic device 1201 (e.g., an electronic device 301 of FIG. 3), which will be described below, may be performed by a processor (e.g., a processor 120 of FIG. 1) of the electronic device 1201. The operations of the electronic device, which will be described below, may correspond to operations 409 to 429 described above with reference to FIG. 4.

Referring to FIG. 12, the electronic device 1201 may be running a weather application. The electronic device 1201 may display a first user interface 1210 for outputting weather information. According to an embodiment, the first user interface 1210 may include a second user interface 1215 for setting an operation of at least one IoT device which supports a capability associated with a capability of the weather application. According to an embodiment, the second user interface 1215 may include information obtained by at least one IoT device (e.g., an air purifier 1202) associated with the capability of the weather application and an item 1220 for setting an operation of the at least one IoT device. The electronic device 1201 may set an operation of the at least one IoT device (e.g., the air purifier 1202) based on a user input for selecting the item 1220. For example, a user of the electronic device 1201 may determine whether to operate the air purifier 1202 based on indoor air quality information output through the second user interface 1215, and the electronic device 1201 may set to control the air purifier 1202 to operate based on the user input for selecting the item 1220. For example, when receiving the user input for selecting the item 1220, the electronic device 1201 may transmit a control request for the air purifier 1202 to an IoT service server (e.g., an IoT service server 302 of FIG. 3). The IoT service server may control the air purifier 1202 to operate based on the control request received from the electronic device 1201.

Hereinafter, a more detailed description will be given of an operation of setting an operation of an IoT device by a smart view application and an operation of controlling the IoT device based on setting information in an electronic device according to an embodiment with reference to FIG. 13.

Figure 13:
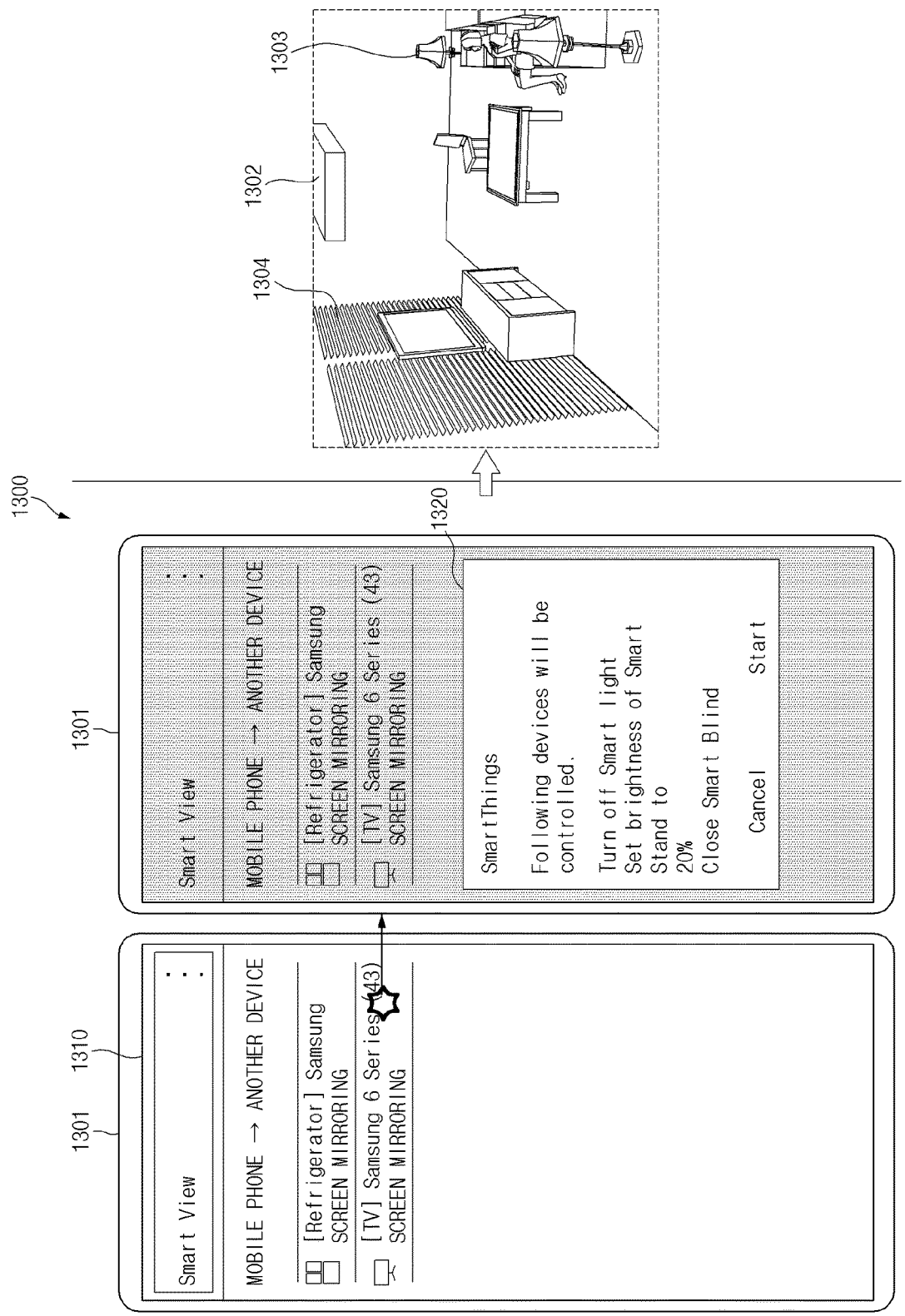
FIG. 13 is a diagram illustrating an example operation of an electronic device according to various embodiments.

FIG. 13 is a diagram 1300 illustrating an example operation of an electronic device according to various embodiments. Operations of an electronic device 1301 (e.g., an electronic device 301 of FIG. 3), which will be described below, may be performed by a processor (e.g., a processor 120 of FIG. 1) of the electronic device 1301. The operations of the electronic device, which will be described below, may correspond to operations 409 to 429 described above with reference to FIG. 4.

Referring to FIG. 13, the electronic device 1301 may be running a smart view application. According to an embodiment, the smart view application may include a capability of outputting content output by the electronic device 1301 through an output device (e.g., a display) of another electronic device (e.g., an IoT device) which communicates wired or wirelessly with the electronic device 1301. The electronic device 1301 may display a first user interface 1310 for setting a smart view capability. The electronic device 1301 may select another electronic device to mirror a screen of the electronic device 1301 based on a user input received through the first user interface 1310. According to an embodiment, the electronic device 1301 may display a second user interface 1320 based on a user input for selecting another electronic device (e.g., [TV] Samsung 6 Series (43)). The second user interface 1320 may include a user interface for setting an operation of at least one IoT device which supports a capability associated with a capability of the smart view application. The electronic device 1301 may filter device information and capability information about an IoT device which supports a capability associated with the smart view capability of the smart view application and may display the second user interface 1320 based on the filtered information. The electronic device 1301 may provide optimized setting information about an operation of at least one IoT device (e.g., a light 1302, a stand 1303, and a blind 1304) around the selected other electronic device (e.g., [TV] Samsung 6 Series (43)) by the second user interface 1320. For example, the optimized setting information may be turning off the light 1302, adjusting brightness of the stand 1303 to 20%, and closing the blind 1304. For example, the electronic device 1301 may set an operation of at least one IoT device based on setting information provided through the second user interface 1320 based on a user input for selecting a "Start" button. For example, the electronic device 1301 may set to turn off the light 1302, adjust brightness of the stand 1303 to 20%, and close the blind 1304 when executing the smart view capability using the other electronic device (e.g., [TV] Samsung 6 Series (43)) selected through the first user interface 1310, based on the user input for selecting the "Start" button. For example, when executing the smart view capability using the specified electronic device (e.g., [TV] Samsung 6 Series (43)), the electronic device 1301 may output a screen of the electronic device 1301 on a display of the specified electronic device (e.g., [TV] Samsung 6 Series (43)) and may transmit a control request for the light 1302, the stand 1303, and the blind 1304 to an IoT service server (e.g., an IoT service server 302 of FIG. 2). The IoT service server may control to turn off the light 1302, adjust brightness of the stand 1303 to 20%, and close the blind 1304 based on the control request received from the electronic device 1301. For example, the IoT service server may control the light 1302, the stand 1303, and the blind 1304 to operate sequentially or at the same time.

Hereinafter, a more detailed description will be given of an operation of setting an operation of an IoT device by a call application and an operation of controlling the IoT device based on setting information in an electronic device according to an embodiment with reference to FIG. 14.

Figure 14:
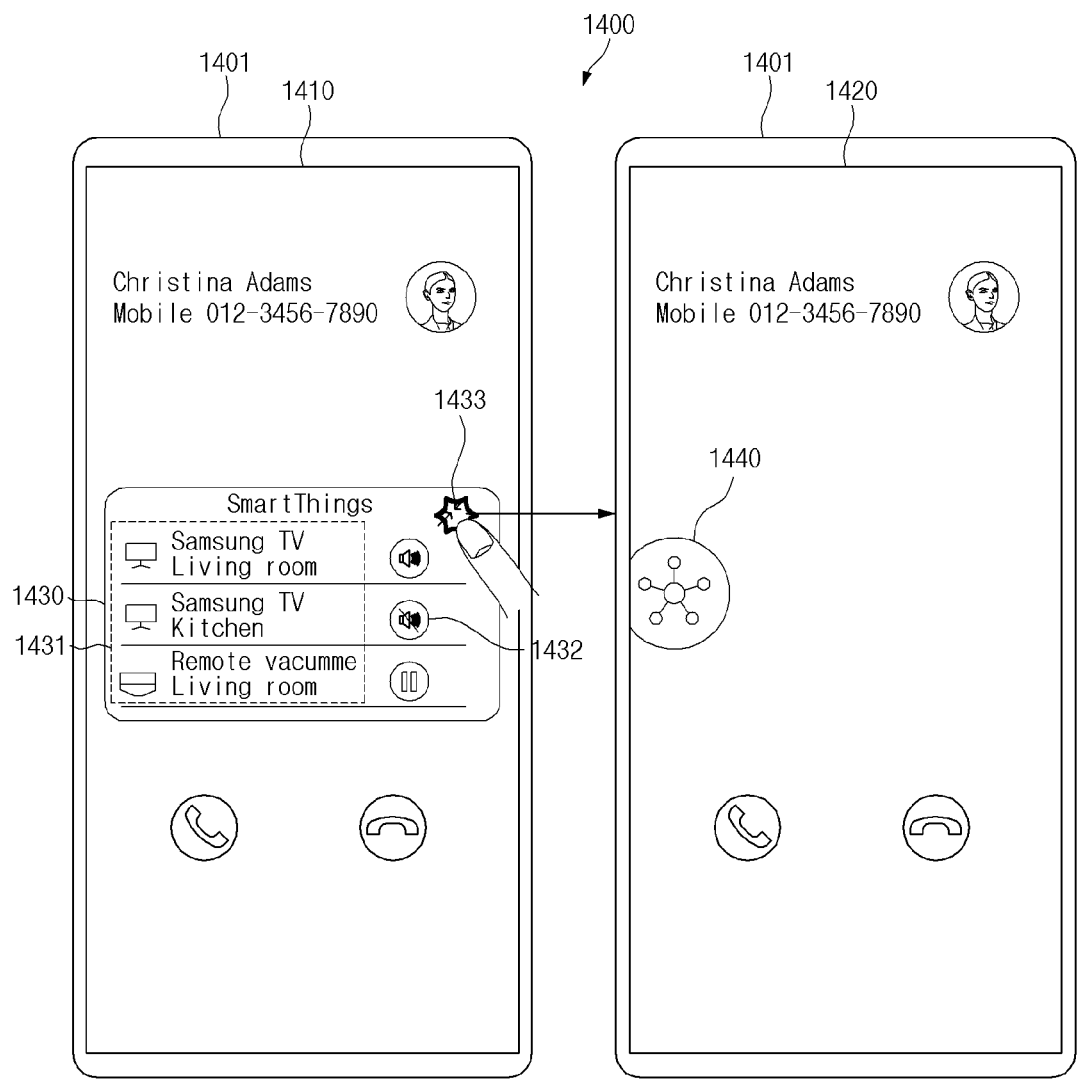
FIG. 14 is a diagram illustrating an example operation of an electronic device according to various embodiments.

FIG. 14 is a diagram 1400 illustrating an example operation of an electronic device according to various embodiments. Operations of an electronic device 1401 (e.g., an electronic device 301 of FIG. 3), which will be described below, may be performed by a processor (e.g., a processor 120 of FIG. 1) of the electronic device 1401. The operations of the electronic device, which will be described below, may correspond to operations 409 to 429 described above with reference to FIG. 4.

Referring to FIG. 14, the electronic device 1401 may be running a call application. For example, the electronic apparatus 1401 may be in a state where it receives a call. The electronic device 1401 may receive a call, thus displaying a first user interface 1410. According to embodiment, the first user interface 1410 may be an incoming call screen. The electronic device 1401 may accept or decline an incoming call based on a user input received through the first user interface 1410. According to an embodiment, the first user interface 1410 may display a second user interface 1430 for setting an operation of an IoT device around the electronic device 1401 as a pop-up screen. The second user interface 1430 may include a user interface for setting an operation of at least one IoT device which supports a capability associated with a capability of the call application. The electronic device 1401 may filter device information and capability information of an IoT device which supports a capability associated with a call capability of the call application and may display the second user interface 1430 based on the filtered information. According to an embodiment, the second user interface 1430 may include a device list 1431 of at least one available IoT device around the electronic device 1401 and an operation setting button (e.g., a first button 1432) for each IoT device. According to an embodiment, the electronic device 1401 may set an operation of an IoT device (e.g., Samsung TV_Kitchen) corresponding to the first button 1432 based on a user input for selecting the first button 1432. For example, the first button 1432 may be an object for a setting about a mute capability. For example, the electronic device 1401 may set to execute a mute capability of a TV in the kitchen based on the user input for selecting the first button 1432. For example, when receiving the user input for selecting the first button 1432, the electronic device 1401 may transmit a control request for the TV in the kitchen to an IoT service server (e.g., an IoT service server 302 of FIG. 3). The IoT service server may execute the mute capability of the TV in the kitchen based on the control request from the electronic device 1401.

According to an embodiment, the second user interface 1430 may include a second button 1433 to which an operation of reducing a pop-up screen is mapped. The electronic device 1401 may reduce the corresponding pop-up screen based on a user input for selecting the second button 1433. For example, the electronic device 1401 may display a third user interface 1420 based on the user input for selecting the second button 1433. The third user interface 1420 may include an icon 1440 where a pop-up window corresponding to the second user interface 1430 is reduced.

Hereinafter, a more detailed description will be given of an operation of setting an operation of an IoT device by a music application and an operation of controlling the IoT device based on setting information in an electronic device according to an embodiment with reference to FIG. 15.

Figure 15:
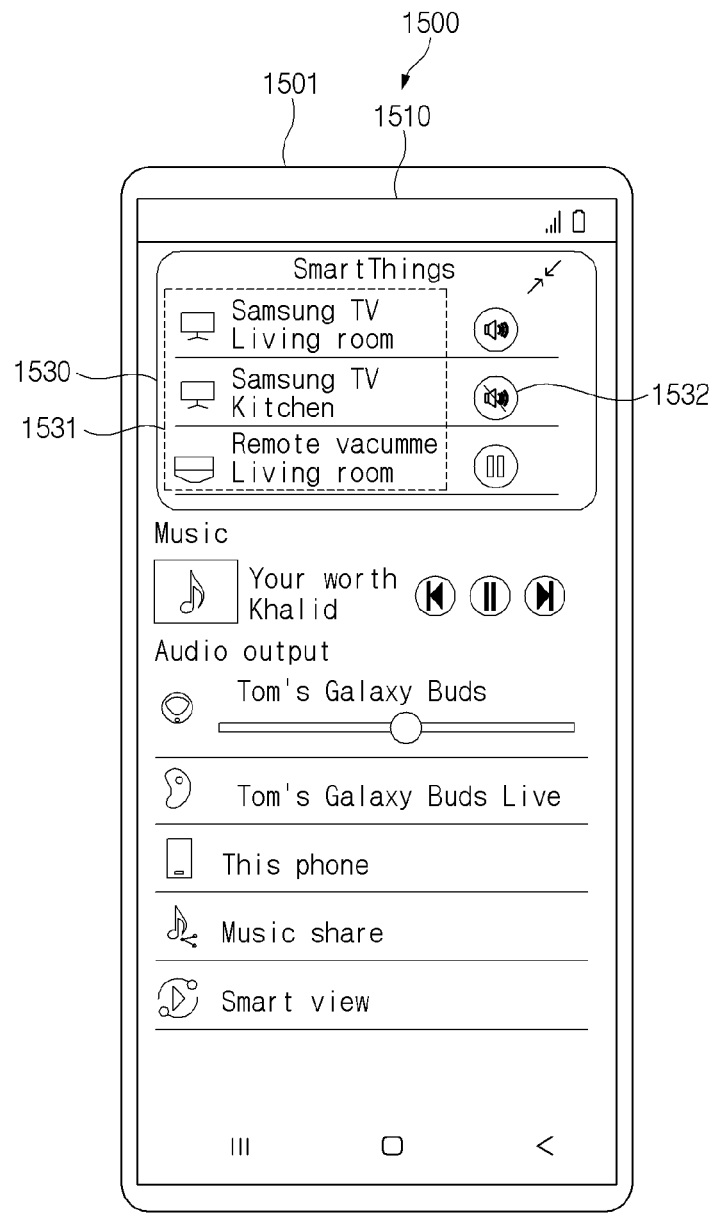
FIG. 15 is a diagram illustrating an example operation of an electronic device according to various embodiments.

FIG. 15 is a diagram 1500 illustrating an example operation of an electronic device according to various embodiments. Operations of an electronic device 1501 (e.g., an electronic device 301 of FIG. 3), which will be described below, may be performed by a processor (e.g., a processor 120 of FIG. 1) of the electronic device 1501. The operations of the electronic device, which will be described below, may correspond to operations 409 to 429 described above with reference to FIG. 4.

Referring to FIG. 15, the electronic device 1501 may be running a music application. For example, the electronic apparatus 1501 may play music based on a user input. The electronic device 1501 may receive a user input for playing music, thus displaying a first user interface 1510. According to embodiment, the first user interface 1510 may be a music playback screen. The electronic device 1501 may set a music playback environment based on a user input received through the first the user interface 1510. According to an embodiment, the first user interface 1510 may display a second user interface 1530 for setting an operation of an IoT device around the electronic device 1501 as a pop-up screen. The second user interface 1530 may include a user interface for setting an operation of at least one IoT device which supports a capability associated with a capability of the music application. The electronic device 1501 may filter device information and capability information of an IoT device which supports a capability associated with a music playback capability of the music application and may display the second user interface 1530 based on the filtered information. According to an embodiment, the second user interface 1530 may include a device list 1531 of at least one available IoT device around the electronic device 1501 and an operation setting button (e.g., a first button 1532) for each IoT device. According to an embodiment, the electronic device 1501 may set an operation of an IoT device (e.g., Samsung TV_Kitchen) corresponding to the first button 1532 based on a user input for selecting the first button 1532. For example, the first button 1532 may be an object for a setting about a mute capability. For example, the electronic device 1501 may set to execute a mute capability of a TV in the kitchen based on the user input for selecting the first button 1532. For example, when receiving the user input for selecting the first button 1532, the electronic device 1501 may transmit a control request for the TV in the kitchen to an IoT service server (e.g., an IoT service server 302 of FIG. 3). The IoT service server may execute the mute capability of the TV in the kitchen based on the control request from the electronic device 1501.

Hereinafter, a more detailed description will be given of an operation of an electronic device according to an embodiment with reference to FIG. 16.

Figure 16:
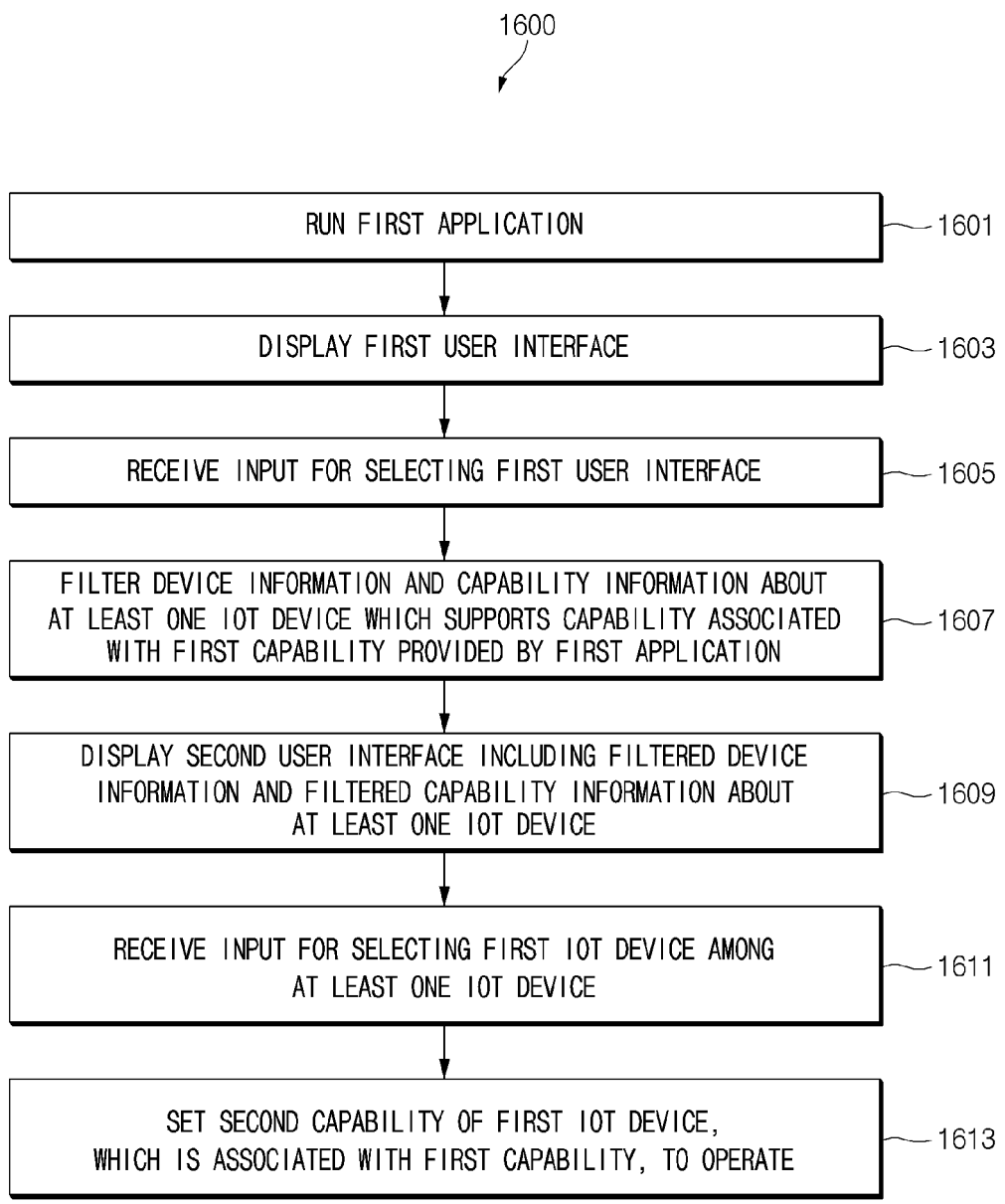
FIG. 16 is a flowchart illustrating an example operation of an electronic device according various embodiments.

FIG. 16 is a flowchart 1600 illustrating an example operation of an electronic device according to various embodiments. Operations of an electronic device (e.g., an electronic device 301 of FIG. 3), which will be described below, may be performed by a processor (e.g., a processor 120 of FIG. 1) of the electronic device.

In operation 1601, the electronic device may run a first application (e.g., a first application 310 of FIG. 3). According to an embodiment, the electronic device may receive a user input for running the first application, thus running the first application. According to an embodiment, the first application may be stored in a memory (e.g., a memory 130 of FIG. 1) of the electronic device and may be an application configured to perform a specified capability. The application may include, for example, a clock, calendar, accessibility (e.g., sound detector), call, weather, smart view, or third party application.

In operation 1603, the electronic device may display a first user interface. According to an embodiment, as the first application is run, the electronic device may display the first user interface on a display (e.g., a display module 160 of FIG. 1).

In operation 1605, the electronic device may receive an input for selecting the first user interface.

In operation 1607, as the input for selecting the first user interface is received, the electronic device may filter device information and capability information about at least one IoT device which supports a capability associated with a first capability provided by the first application. According to an embodiment, the electronic device may filter device information about the at least one IoT device which supports the capability associated with the first capability provided by the first application based on IoT device information registered with a server (e.g., an IoT service server 302 of FIG. 3) and IoT device information supported by the application. According to an embodiment, the IoT device information registered with the server may include information which is received from the server (e.g., the IoT service server 302 of FIG. 3) through a communication circuit (e.g., a communication module 190 of FIG. 1) and is stored in a database (e.g., a devices & capabilities database 321 of FIG. 3) by the electronic device. According to an embodiment, the IoT device information supported by the application may include information which is received from a server (e.g., an application policy 304 of FIG. 3) through the communication circuit and is stored in a database (e.g., an app policy database 323) by the electronic device. According to an embodiment, the method for filtering the device information and the capability information about the at least one IoT device which supports the capability associated with the first capability provided by the first application in the electronic device may be the same as or similar to the method described above with reference to FIGS. 3 and 4.

In operation 1609, the electronic device may display a second user interface including the filtered device information and the filtered capability information about the at least one IoT device on the display. According to an embodiment, the second user interface may include a user interface for setting the capability of the filtered at least one IoT device to operate. According to an embodiment, the second user interface may include a device list of the filtered at least one IoT device and a capability list including at least one capability of each IoT device. For example, the electronic device may display the device list of the filtered at least one IoT device and may display a capability list for an IoT device selected in the device list. As another example, the electronic device may display a list in the form of integrating the device list of the filtered at least one IoT device with the capability list of each IoT device. Because the second user interface displayed by the electronic device according to an embodiment and the method for displaying the second user interface are described above with reference to FIGS. 3 to 5, a duplicated description may not be repeated or may be brief.

In operation 1611, the electronic device may receive an input for selecting a first IoT device among the at least one IoT device. According to an embodiment, the electronic device may receive the input for selecting the first IoT device among the at least one IoT device through the second user interface. According to an embodiment, the electronic device may select a capability in the capability list including at least one capability of the first IoT device and may receive a setting input for the selected capability.

In operation 1613, the electronic device may set a second capability of the first IoT device associated with the first capability to operate. According to an embodiment, as the input for selecting the first IoT device is received, the electronic device may set the second capability of the first IoT device, which is associated with the first capability provided by the first application, to operate. According to an embodiment, the method for setting whether the second capability operates and an operation method based on the input received through the second user interface may be the same as or similar to the method described above with reference to FIGS. 3 and 4. According to an embodiment, as the event which is the execution condition of the first capability provided by the first application occurs, the second capability may be executed.

According to an embodiment, as the event which is the execution condition of the first capability occurs, the electronic device may control the second capability of the first IoT device to operate. According to an embodiment, the method for controlling the second capability of the first IoT device to operate in the electronic device may be the same as or similar to the method described above with reference to FIGS. 3 and 4.

According to an example embodiment of the disclosure, an electronic device (e.g., an electronic device 101 of FIG. 1, an electronic device 301 of FIG. 3, an electronic device 901 of FIG. 9, an electronic device 1001 of FIG. 10, an electronic device 1101 of FIG. 11, an electronic device 1201 of FIG. 12, an electronic device 1301 of FIG. 13, an electronic device 1401 of FIG. 14, or an electronic device 1501 of FIG. 15) may include: a display (e.g., a display module 160 of FIG. 3), a processor (e.g., a processor 120 of FIG. 1) operatively connected with the display, and a memory (e.g., a memory 130 of FIG. 1) operatively connected with the display and the processor and storing a first application (e.g., an application 146 of FIG. 1 or a first application 310 of FIG. 3). The memory may store one or more instructions which, when executed, cause the processor to be configured to: control the display to display a first user interface on the display based on the first application being run, filter device information and capability information about at least one Internet of things (IoT) device which supports a capability associated with a first capability provided by the first application based on IoT device information registered with a server (e.g., a server 108 of FIG. 1 or an IoT service server 302 of FIG. 3) and IoT device information supported by an application based on an input for selecting the first user interface being received, control the display to display a second user interface including the filtered device information and the filtered capability information about the at least one IoT device on the display, and set a second capability of a first IoT device among the at least one IoT device, the second capability being associated with the first capability, to operate based on an input for selecting the first IoT device being received through the second user interface.

According to an example embodiment of the disclosure, the second capability may be executed as an event which is an execution condition of the first capability occurs.

According to an example embodiment of the disclosure, the electronic device may further include a communication circuit (e.g., a communication module 190 of FIG. 1). The instructions, when executed, may cause the processor to; receive and store device information and capability information of an IoT device registered with a first server (e.g., an IoT service server 302 of FIG. 3) from the first server through the communication circuit in a first database (e.g., a devices & capabilities database 321 of FIG. 3) and receive and store device information and capability information of an IoT device associated for each capability provided by at least one application from a second server (e.g., an application policy server 304 of FIG. 3) through the communication circuit in a second database (e.g., an app policy database 323 of FIG. 3).

According to an example embodiment of the disclosure, the instructions, when executed, may cause the processor to: receive the device information and the capability information of the IoT device registered with the first server from the first server through the communication circuit and update the information stored in the first database, based on the electronic device receiving a notification that information stored in the first server is added, corrected, or deleted from the first server through the communication circuit, based on the electronic device being powered on, or based on the electronic device receiving a user account.
Occurring According to an example embodiment of the disclosure, the instructions, when executed, may cause the processor to: determine whether the first IoT device is included in IoT devices registered with the server based on the event occurring and control the second capability of the first IoT device to operate based on the first IoT device being included in the IoT devices registered with the server.

According to an example embodiment of the disclosure, the second user interface may include an option to operate the second capability of the first IoT device only based on the electronic device having the same location information as the first IoT device.

According to an example embodiment of the disclosure, the instructions, when executed, may cause the processor to: identify the first application and filter the device information and the capability information about the at least one IoT device which supports the capability associated with the first capability provided by the identified first application in the IoT device information registered with the server.

According to an example embodiment of the disclosure, the instructions, when executed, may cause the processor to identify a user account input to the electronic device and filter the device information and the capability information about the at least one IoT device which supports the capability associated with the first capability provided by the first application in IoT device information registered with the identified user account.

According to an example embodiment of the disclosure, the operation of the first IoT device may include: outputting a notification. The instructions, when executed, may cause the processor to control the first IoT device to output the notification based on a language set in the electronic device or a setting language of the first IoT device, based on the event occurring.

According to an example embodiment of the disclosure, a method for providing a user interface in an electronic device (e.g., an electronic device 101 of FIG. 1, an electronic device 301 of FIG. 3, an electronic device 901 of FIG. 9, an electronic device 1001 of FIG. 10, an electronic device 1101 of FIG. 11, an electronic device 1201 of FIG. 12, an electronic device 1301 of FIG. 13, an electronic device 1401 of FIG. 14, or an electronic device 1501 of FIG. 15) may include: displaying a first user interface on a display (e.g., a display module 160 of FIG. 3) of the electronic device based on a first application (e.g., an application 146 of FIG. 1 or a first application 310 of FIG. 3) stored in a memory (e.g., a memory 130 of FIG. 1) of the electronic device being run, filtering device information and capability information about at least one Internet of things (IoT) device which supports a capability associated with a first capability provided by the first application based on IoT device information registered with a server (e.g., a server 108 of FIG. 1 or an IoT service server 302 of FIG. 3) and IoT device information supported by an application based on an input for selecting the first user interface being received, displaying a second user interface including the filtered device information and the filtered capability information about the at least one IoT device on the display, and setting a second capability of a first IoT device among the at least one IoT device, the second capability being associated with the first capability, to operate based on an input for selecting the first IoT device being received through the second user interface.

According to an example embodiment of the disclosure, the second capability may be executed based on an event which is an execution condition of the first capability occurring.

According to an example embodiment of the disclosure, the method may include: receiving and storing device information and capability information of an IoT device registered with a first server (e.g., an IoT service server 302 of FIG. 3) from the first server through a communication circuit (e.g., a communication module 190 of FIG. 1) in a first database (e.g., a devices & capabilities database 321 of FIG. 3) and receiving and storing device information and capability information of an IoT device associated for each capability provided by at least one application from a second server (e.g., an application policy server 304 of FIG. 3) through the communication circuit in a second database (e.g., an app policy database 323 of FIG. 3).

According to an example embodiment of the disclosure, the method may include: receiving the device information and the capability information of the IoT device registered with the first server from the first server through the communication circuit and updating the information stored in the first database, based on receiving a notification that information stored in the first server being added, corrected, or deleted from the first server through the communication circuit, based on the electronic device being powered on, or based on the electronic device receiving a user account.

According to an example embodiment of the disclosure, the method may include controlling the second capability of the IoT device to operate based on the event occurring.

According to an example embodiment of the disclosure, the controlling may include: determining whether the first IoT device is included in IoT devices registered with the server based on the event occurring and controlling the second capability of the first IoT device to operate based on the first IoT device being included in the IoT devices registered with the server.

According to an example embodiment of the disclosure, the second user interface may include an option to operate the second capability of the first IoT device only based on the electronic device having the same location information as the first IoT device.

According to an example embodiment of the disclosure, the filtering may include: identifying the first application and filtering the device information and the capability information about the at least one IoT device which supports the capability associated with the first capability provided by the identified first application in the IoT device information registered with the server.

According to an example embodiment of the disclosure, the filtering may include: identifying a user account input to the electronic device and filtering the device information and the capability information about the at least one IoT device which supports the capability associated with the first capability provided by the first application in IoT device information registered with the identified user account.

According to an example embodiment of the disclosure, the operation of the first IoT device may include outputting a notification. The method may include controlling the first IoT device to output the notification based on a language set in the electronic device or a setting language of the first IoT device, based on the event occurring.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a display;
at least one processor including processing circuitry; and
memory storing a first application and a second application,
wherein the memory stores instructions that, when executed by the at least one processor, cause the electronic device to:
receive Internet of things (IoT) device information from a first external server, wherein the IoT device information includes device name information and device function information;
control the display to display a first user interface associated with the first application based on the first application being run;
filter at least one IoT device associated with a function of the first application among a plurality of IoT devices based on the received IoT device information;
control the display to display a second user interface associated with the first application including device name information and device function information about the filtered at least one IoT device based on an input for selecting the first user interface being received;
receive, through the second user interface, an input for selecting a first function of a first IoT device among the at least one IoT device;
set the first function of the first IoT device to operate when a first event which is an execution condition of the function of the first application occurs,
display a third user interface associated with the second application on the display when the second application is run;
filter at least one IoT device associated with a function of the second application among the plurality of IT devices based on the received IoT device information;
display a fourth user interface associated with the second application including device name information and device function information about the filtered at least one IoT device associated with the function of the second application based on being received an input for selecting the third user interface;

receive, through the fourth user interface, an input for selecting a second function of a second IoT device among the at least one IoT device associated with the function of the second application; and
set the second function of the second IoT device to operate when a second event which is an execution condition of the function of the second application occurs,
wherein the function of the first application and the function of the second application are performed independently by the electronic device.

2. The electronic device of claim 1, further comprising:
a communication circuit,
wherein the instructions, when executed by the at least one processor, cause the electronic device to:
receive and store device name information and device function information of an IoT device registered with a second external server from the second external server through the communication circuit in a first database.

3. The electronic device of claim 2, wherein the instructions, when executed by the at least one processor, cause the electronic device to:
receive the device name information and the device function information of the IoT device registered with the second external server from the second external server through the communication circuit and update the information stored in the first database, based on the electronic device receiving a notification that information stored in the second external server is added, corrected, or deleted from the second external server through the communication circuit, based on the electronic device being powered on, or based on the electronic device receiving a user account.

4. The electronic device of claim 1, wherein the instructions, when executed by the at least one processor, cause the electronic device to:
determine whether the first IoT device is included in IoT devices registered with the second external server based on the first event occurring; and
control the first function of the first IoT device to operate based on the first IoT device being included in the IoT devices registered with the second external server.

5. The electronic device of claim 1, wherein the second user interface includes an option to operate the first function of the first IoT device only based on the electronic device having the same location information as the first IoT device.

6. The electronic device of claim 1, wherein the instructions, when executed by the at least one processor, cause the electronic device to:
filter the at least one IoT device associated with the first application and registered with the second external server based on the device name information and the device function information of the IoT device registered with the second external server.

7. The electronic device of claim 1, wherein the instructions, when executed by the at least one processor, cause the electronic device to:
identify a user account input to the electronic device; and
filter the at least one IoT device associated with the first application and registered with the identified user account based on the IoT device information registered with the identified user account received from the second external server.

8. The electronic device of claim 1,
wherein the instructions, when executed by the at least one processor, cause the electronic device to:
control the first IoT device to output a notification based on a language set in the electronic device or a setting language of the first IoT device, based on the first event occurring.

9. A method for providing a user interface in an electronic device, the method comprising:
receiving Internet of things (IoT) device information from a first external server, wherein the IoT device information includes device name information and device function information;
displaying a first user interface associated with a first application on a display of the electronic device based on the first application stored in a memory of the electronic device being run;
filtering at least one IoT device associated with a function of the first application among a plurality of IoT devices based on the received IoT device information;
displaying a second user interface associated with the first application including device name information and device function information about the filtered at least one IoT device on the display based on being received an input for selecting the first user interface;
receiving, through the second user interface, an input for selecting a first function of a first IoT device among the at least one IoT device;
setting the first function of the first IoT device to operate when a first event which is an execution condition of the function of the first application occurs,
displaying a third user interface associated with a second application on the display when the second application stored in the memory is run;
filtering at least one IoT device associated with a function of the second application among the plurality of IoT devices based on the received IoT device information;
displaying a fourth user interface associated with the second application including device name information and device function information about the filtered at least one IoT device associated with the function of the second application based on an input for selecting the third user interface being received;
receiving, through the fourth user interface, an input for selecting a second function of a second IoT device among the at least one IoT device associated with the function of the second application; and
setting the second function of the second IoT device to operate when a second event which is an execution condition of the function of the second application occurs,
wherein the function of the first application and the function of the second application are performed independently by the electronic device.

10. The electronic device of claim 9, further comprising:
receiving and storing device name information and device function information of an IoT device registered with a second external server from the second external server through a communication circuit in a first database.

11. The electronic device of claim 10, further comprising:
receiving the device name information and the device function information of the IoT device registered with the second external server from the second external server through the communication circuit and updating the information stored in the first database, based on receiving a notification that information stored in the second external server being added, corrected, or deleted from the second external server through the communication circuit, based on the electronic device being powered on, or based on the electronic device receiving a user account.

12. The electronic device of claim 9, further comprising:
   determining whether the first IoT device is included in IoT devices registered with the second external server based on the first event occurring; and
   controlling the first function of the first IoT device to operate based on the first IoT device being included in the IoT devices registered with the second external server.

13. The method of claim 9, wherein the second user interface includes an option to operate the first function of the first IoT device only based on the electronic device having the same location information as the first IoT device.

14. The method of claim 9, wherein the filtering includes:
   filtering the at least one IoT device associated with the first application and registered with the second external server based on the device name information and the device function information of the IoT device registered with the second external server.

15. The method of claim 9, wherein the filtering includes:
   identifying a user account input to the electronic device; and
   filtering the at least one IoT device associated with the first application and registered with the identified user account based on the IoT device information registered with the identified user account received from the second external server.

16. The method of claim 9, wherein first function of the first IoT device includes outputting a notification, the method further comprising:
   controlling the first IoT device to output the notification based on a language set in the electronic device or a setting language of the first IoT device, based on the first event occurring.

\* \* \* \* \*